(12) United States Patent
Lee et al.

(10) Patent No.: US 12,529,621 B2
(45) Date of Patent: Jan. 20, 2026

(54) COMPRESSED FLUID VESSEL MONITORING APPARATUS AND METHOD

(71) Applicant: Air Products and Chemicals, Inc., Allentown, PA (US)

(72) Inventors: Thomas Lee, Basingstoke (GB); David Bryant, Narborough (GB); Thomas Holbeche, Church Crookham (GB); Stephen Mellor, Worcester (GB); Phil Tranter, Whitchurch (GB); Csaba Alfoldi, Brussels (BE); Craig Hunt, Farnham (GB); Matthew Isbell, Basingstoke (GB)

(73) Assignee: Air Products and Chemicals, Inc., Allentown, PA (US)

( * ) Notice: Subject to any disclaimer, the term of this patent is extended or adjusted under 35 U.S.C. 154(b) by 366 days.

(21) Appl. No.: 17/880,785

(22) Filed: Aug. 4, 2022

(65) Prior Publication Data
US 2024/0044738 A1 Feb. 8, 2024

(51) Int. Cl.
| | | |
|---|---|---|
| *G01M 3/32* | (2006.01) | |
| *G01F 23/18* | (2006.01) | |
| *G08B 21/18* | (2006.01) | |
| *H04Q 9/00* | (2006.01) | |

(52) U.S. Cl.
CPC ......... *G01M 3/3236* (2013.01); *G01F 23/185* (2013.01); *G08B 21/182* (2013.01); *H04Q 9/00* (2013.01); *H04Q 2209/40* (2013.01)

(58) Field of Classification Search
CPC .. G01M 3/3236; G01F 23/185; G08B 21/182; H04Q 9/00; F17C 13/02

USPC .......................................................... 73/197
See application file for complete search history.

(56) References Cited

U.S. PATENT DOCUMENTS

| | | | | | |
|---|---|---|---|---|---|
| 3,174,002 | A | * | 3/1965 | Golbeck ............... | H01H 15/005 200/16 R |
| 3,341,701 | A | * | 9/1967 | Moore ................... | F21L 2/00 362/196 |
| 3,374,449 | A | * | 3/1968 | Moore ................... | H01P 1/125 200/549 |

(Continued)

FOREIGN PATENT DOCUMENTS

| | | |
|---|---|---|
| CN | 103646302 B | 5/2017 |
| EP | 3734240 | 11/2020 |

(Continued)

*Primary Examiner* — John Fitzgerald
(74) *Attorney, Agent, or Firm* — Robert A. Diaz

(57) ABSTRACT

Apparatuses and methods for compressed fluid vessel monitoring can permit a user to more easily order replacement vessels, monitor use, monitor inventory and return empty vessels. Embodiments can utilize a collar connectable to a vessel to help facilitate such functionality. The collar can be adapted to transmit signals to a data processing system. The data processing system can be adapted to permit a user to track the location and fill status of the vessel as well as order a replacement vessel and disposal or return of an empty vessel. Instrumented vessels can also convey sensor data to help identify a leak condition or other condition of the vessel. In some embodiments, the data processing system can be adapted for integration into a user's inventory system and/or purchasing system as well as a supplier's system to facilitate communications concerning vessel fill status, reorder, and/or vessel return.

21 Claims, 10 Drawing Sheets

(56) References Cited

U.S. PATENT DOCUMENTS

| | | | | |
|---|---|---|---|---|
| 4,568,822 A * | 2/1986 | Betzko | G06C 3/00 | 235/78 R |
| 4,827,643 A * | 5/1989 | Hearst | F17C 13/003 | 206/509 |
| 4,951,596 A * | 8/1990 | Wallace, Jr. | G09F 3/16 | 116/323 |
| 5,386,795 A * | 2/1995 | Bartholomew | G09F 11/23 | 116/315 |
| 5,440,477 A * | 8/1995 | Rohrberg | F17C 13/04 | 700/282 |
| 5,539,188 A * | 7/1996 | Fallah | F17C 13/003 | 235/491 |
| 5,555,655 A * | 9/1996 | Yager | F17C 13/003 | 40/306 |
| 5,607,078 A * | 3/1997 | Nordberg | G09F 9/37 | 220/756 |
| 5,697,173 A * | 12/1997 | McCarrick | G09F 3/00 | 40/310 |
| 5,713,692 A * | 2/1998 | McCarrick | G09F 7/00 | 411/908 |
| 5,883,376 A * | 3/1999 | Rosch | G06K 7/10316 | 235/375 |
| 5,913,344 A * | 6/1999 | Wronski | F17C 5/005 | 141/94 |
| 5,949,049 A * | 9/1999 | McCarrick | G06K 19/07 | 235/441 |
| 5,953,682 A * | 9/1999 | McCarrick | G06Q 10/087 | 705/28 |
| 6,314,986 B1 | 11/2001 | Zheng et al. | | |
| 7,114,510 B2 * | 10/2006 | Peters | F16K 31/60 | 137/1 |
| 7,448,402 B2 | 11/2008 | Martrich et al. | | |
| 7,575,018 B2 * | 8/2009 | Smith | F16K 3/0254 | 251/293 |
| 8,328,457 B2 * | 12/2012 | Werth | A61M 39/1011 | 403/313 |
| 8,430,116 B1 * | 4/2013 | Smith | F16K 3/0254 | 251/293 |
| 8,875,923 B2 * | 11/2014 | Koo | F17C 13/003 | 40/310 |
| 9,255,870 B2 | 2/2016 | Downie et al. | | |
| 9,581,297 B2 | 2/2017 | Downie et al. | | |
| 9,665,107 B2 | 5/2017 | Pemberton | | |
| 9,690,304 B2 | 6/2017 | Downie | | |
| 9,709,188 B2 | 7/2017 | Williams et al. | | |
| 9,816,642 B2 * | 11/2017 | Fowler | F17C 13/004 | |
| 9,822,930 B2 | 11/2017 | Williams et al. | | |
| 9,870,007 B2 | 1/2018 | Downie et al. | | |
| 10,132,448 B2 | 11/2018 | Pemberton | | |
| 10,984,909 B2 * | 4/2021 | Thind | G06Q 10/0832 | |
| 11,703,188 B2 * | 7/2023 | Rieker | G01V 8/10 | 73/29.01 |
| 2005/0073098 A1 * | 4/2005 | Weisman | A63F 3/00075 | 273/289 |
| 2007/0103324 A1 | 5/2007 | Kosuge et al. | | |
| 2010/0230963 A1 * | 9/2010 | Gayer | F16B 2/10 | 285/415 |
| 2011/0154868 A1 * | 6/2011 | Eizen | F17C 13/04 | 70/164 |
| 2014/0084542 A1 * | 3/2014 | Ziran | A63F 3/00697 | 273/288 |
| 2019/0003649 A1 * | 1/2019 | Lambert | F17C 13/025 | |
| 2019/0120431 A1 * | 4/2019 | Carroll | F17C 5/00 | |
| 2021/0081891 A1 * | 3/2021 | Mclellan | G06Q 10/087 | |
| 2021/0364130 A1 | 11/2021 | Grevstad | | |

FOREIGN PATENT DOCUMENTS

| | | | |
|---|---|---|---|
| EP | 3419304 | 3/2021 | |
| EP | 3419304 B1 * | 3/2021 | F17C 13/02 |
| EP | 3957899 | 2/2022 | |
| GB | 2581343 A | 8/2020 | |

* cited by examiner

COMPRESSED FLUID VESSEL MONITORING APPARATUS AND METHOD

FIELD OF THE INVENTION

The present innovation relates to compressed fluid vessels (e.g. gas cylinders and the like, etc.), apparatuses for monitoring and/or tracking such vessels, and methods of making and using such apparatuses.

BACKGROUND OF THE INVENTION

A compressed gas cylinder is a pressure vessel designed to contain gases at high pressures that are significantly greater than atmospheric pressure. Compressed gas cylinders are used in a wide range of markets, including industrial, medical and those with higher specifications such as electronic manufacturing who utilize ultra-high purity, corrosive, toxic, pyrophoric or specialty gas mixtures. Many applications for which gas cylinders are used involve the provision of purified permanent gases or gas mixtures. Examples include Oxygen (O2), Nitrogen (N2), Argon (Ar), Helium (He), Hydrogen (H2), Methane (CH4), Carbon Dioxide (CO2), Acetylene (C2H2), Krypton (Kr) and Neon (Ne). Examples of compressed gas cylinders can be appreciated from U.S. Pat. Nos. 10,132,448; 9,870,007; 9,822,930; 9,709,188; 9,690,304; 9,665,107; 9,581,297; 9,255,870; 7,448,402; and 6,314,986 and United Kingdom Patent Publication No. GB 2581343 A and Chinese Patent No. CN 103646302 B.

Typically, pressurized gas containers include vessel bodies made of steel, aluminum or composites that are capable of storing compressed, liquefied or dissolved gases. Typical cylinder pressures can range from 200-300 bar and for some gases, such as hydrogen or helium, the cylinder pressure can be as high as 900 bar. Such high storage pressures are potentially hazardous, and cylinders are required to meet stringent safety standards and, of course, require careful handling by the end user.

SUMMARY

We have identified that there are issues with the current systems employed with the re-ordering of pressurized vessels. Often, users will attempt to utilize a vessel and only learn they need to order a replacement when the vessel is found to be empty. The ordering process (or re-ordering process) can delay the user's ability to run tests, carry out various different types of analysis, perform industrial tasks, or provide a service or treatment. For example, re-ordering vessels can, and often does, affect a user's ability to carry out their scheduled activity such as; calibration of analytical equipment, welding, or laser cutting. In a medical environment, the implications of an empty vessel can be significant as lifesaving treatments may not be possible.

Often, to facilitate the ordering of new pressurized vessels, the user must also transport the empty vessel to a dedicated location so it can be returned to a supplier to be refilled. This can further complicate the ordering process or cause other delays as a user may fail to move the empty vessel to the dedicated return location after ordering a replacement vessel. These errors can result in a number of unnecessary actions, additional costs and inconveniences to an organization. For instance, personnel may see the empty vessel in the wrong location and mistakenly believe it to be full. Such personnel may then try to use the empty vessel, realize it is empty, and then order another replacement vessel, which may not be required as an order may have already been placed.

Embodiments of our compressed fluid vessels (e.g. gas cylinders and the like, etc.), apparatuses for monitoring and/or tracking such vessels (e.g. systems or devices configured for performing monitoring and/or tracking of vessels), and methods of monitoring such vessels, methods of providing such vessels, and methods for distribution and/or inventory management of such vessels can help address the problems we have identified. For example, embodiments can be configured to facilitate monitoring of the fill level of a vessel and provide at least one type of indication for indicating the vessel is empty or near empty (e.g. within a pre-selected threshold level of being empty), experiencing a leak, and/or is at a particular location. Embodiments can also be configured to help automate the ordering process to reorder new vessels to replace empty or near empty vessels. The ordering process can be adapted so that it also facilitates the recycled use of empty vessels. Some embodiments can permit ordering to be initiated by movement of an empty vessel to a pre-selected return location and/or triggering of an empty confirmation actuation mechanism.

Embodiments can be configured for utilization with a number of different types of network configurations and/or user facility arrangements. Embodiments can also be adaptable to address user-specific needs for integration with a user purchasing system and/or user inventory management system.

In a first aspect, an apparatus for monitoring a vessel retaining a compressed fluid is provided. The apparatus can include a tracking device comprising a collar body that is attachable to a body of a vessel retaining a compressed fluid. The tracking device can have a wireless transmitter device configured to wirelessly transmit data or a signal to indicate the vessel is empty in response to the vessel being determined to be empty or within a pre-selected emptiness threshold.

In a second aspect, the collar body can be comprised of at least one sidewall that defines an upper opening, a bottom opening, and a cavity. The cavity can be in communication with the upper opening and the bottom opening to retain a portion of the body of the vessel therein. An indicator element can be positionable within a slot of the collar body or on the collar body. The indicator element can have at least one indicia for indicating a status of the vessel. The one or more indicia can include an empty indicator, a full indicator, an in-use indicator, and/or an in-use and empty indicator, for example. For instance, there can be multiple indicia and the indicator element can be a moveable indicator element that is moveably positionable between different positions to adjust which of the indicia is viewable via the slot.

In a third aspect, the tracking device can include at least one attachment ring attachable to the collar body for attaching the collar body to the body of the vessel. The attachment ring can include at least one guide structure that can be defined on the attachment ring to facilitate retaining the collar body on the attachment ring and can also permit rotation of the collar body about the attachment ring in opposite directions (e.g. clockwise and counterclockwise directions). The guide structure can define the path of motion for the collar body and/or help retain the collar body on the attachment ring. In some embodiments of the third aspect, the guide structure can include at least one lower lip that can extend along an entire periphery of a lower portion of the body of the attachment ring (e.g. a circumference of the attachment ring). A groove can be defined above the lower lip. An optional upper lip can also be provided to help retain the upper portion of the collar body in the groove for attachment to the attachment ring. The upper portion of the collar body can have an interference fit attachment that permits the collar body to rotate along an outer periphery, or circumference, of the attachment ring along a path of travel defined by the groove and/or lip(s). The upper portion of the collar body can engage and/or contact the body of the attachment ring within the groove and/or lower lip and can be slid or otherwise moved in a first direction along the groove. The upper portion of the collar body can engage and/or contact the body of the attachment ring within the groove and/or lower lip and can be slid or otherwise moved in a second direction along the groove as well. This second direction of motion can be opposite the first direction of motion (e.g. the first direction can be counterclockwise and the second direction can be clockwise or the first direction can be clockwise and the second direction can be counterclockwise).

In a fourth aspect, the collar body can include sidewalls that are releasably connectable to each other to form the collar body. Each sidewall can include a first side that has one or more openings and a second side that has one or more prongs. The openings can include upper and lower openings and the prongs can include upper and lower prongs, for example. For instance, a lower prong of a first sidewall can extend from the first sidewall's second side can be sized and configured to resiliently pass into the lower opening of a first side of a second sidewall for a mating interconnection therein. A lower prong of a second sidewall can extend from the second sidewall's second side can be sized and configured to resiliently pass into the lower opening of a first side of a first sidewall for a mating interconnection therein. An upper prong of the first sidewall that can extend from the first sidewall's second side can be sized and configured to resiliently pass into the upper opening of a first side of the second sidewall for a mating interconnection therein. An upper prong of the second sidewall can extend from the second sidewall's second side and can be sized and configured to resiliently pass into the upper opening 10*op* of the first side of the first sidewall for a mating interconnection therein.

In a fifth aspect, the wireless transmitter device can be positioned and configured to transmit the data or signal to provide at least one of vessel identifier information, transmitter identifier information, vessel capacity status information, fluid type information identifying a fluid stored in the vessel, vessel pressure sensor information, vessel density sensor information, vessel liquid level sensor information, and vessel location information.

In a sixth aspect, a remote management system can be positioned and configured to receive the data or signal from the transmitter device of the tracking device, evaluate the data or signal, determine whether the vessel needs replacing, and, in response to determining the vessel needs replacing sending at least one notification for replacement of the vessel. The notification can include at least one first notification indicating a replacement vessel is ordered to replace the vessel to which the tracking device is attached or releasably attached.

In a seventh aspect, at least one user device and/or at least one network access device can be positioned and configured to receive the data or signal from the transmitter device of the tracking device and forward the data or the signal to the remote management system. For example, there can be a user device positioned and configured to receive the data or signal from the transmitter device of the tracking device, evaluate the data or signal, determine whether the vessel needs to be replaced, and, in response to determining the vessel needs to be replaced, send at least one notification for replacement of the vessel. As another example, there can be at least one network access device positioned to receive the data or signal from the transmitter device of the tracking device and forward the data or the signal to the remote management system and/or a user device.

In an eighth aspect, a user device or a remote management system can be positioned and configured to receive the data or signal from the transmitter device of the tracking device, evaluate the data or signal to determine a leak status of the vessel, and, in response to determining there is a leak, communicate at least one notification to identify a leak condition of the vessel (e.g send at least one notification, etc.).

In a ninth aspect, the data or signal from the transmitter device of the tracking device can include sensor data from a sensor communicatively connectable to the tracking device. The data can be sensor data from a pressure sensor connected to the vessel, a density sensor connected to the vessel. or a liquid level sensor connected to the vessel, for example In a tenth aspect, the tracking device can include a positional indicator element that is positioned to detect at least one position of the wireless transmitter device for determining the vessel is empty or within the pre-selected emptiness threshold. The wireless transmitter device can be configured to wirelessly transmit the data or the signal to indicate the vessel is empty in response to the positional indicator element providing an indication that the wireless transmitter device is in a position to indicate the vessel is empty or within the pre-selected emptiness threshold.

In an eleventh aspect, the first above noted aspect can be combined with one or more features of the second aspect through the tenth aspects. For instance, the first aspect can include one or more of the second aspect, third aspect, fourth aspect, fifth aspect, sixth aspect, seventh aspect, eighth aspect, ninth aspect, and tenth aspect. As another example the first aspect can include all the features of the above noted second through tenth aspects or only a selected set of such features.

In a twelfth aspect, a method of monitoring a vessel is provided. Embodiments of the method can include use of an embodiment of the apparatus consistent with one or more of the above noted first through eleventh aspects. In some embodiments, the method can include providing a vessel having a tracking device connected to a body of the vessel, monitoring a capacity of fluid retained in a cavity of the vessel via the tracking device, and providing an indication that the capacity of the fluid retained in the cavity of the vessel is within a pre-selected emptiness threshold or below a pre-selected capacity threshold via the tracking device.

In a thirteenth aspect, the indication can be provided via adjustment of an indicator element to display an emptiness indicator. The indicator element can be moved to display the emptiness indicator, for example.

In a fourteenth aspect, the method can include sending, via a transmitter device of the tracking device, data or a signal for notifying a user device or a remote management device that the vessel is within the pre-selected emptiness threshold or below the pre-selected capacity threshold.

In a fifteenth aspect, the method can include automatically ordering a new vessel to replace the vessel in response to receipt of the data or signal notifying the user device or the remote management device that the vessel is within the pre-selected emptiness threshold or below the pre-selected capacity threshold.

In a sixteenth aspect, the monitoring of the capacity of fluid retained in a cavity of the vessel via the tracking device can include the transmitter device of the tracking device sending data indicating at least one of: (i) vessel identifier information, (ii) vessel capacity status information, (iii) fluid type information identifying a fluid stored in the vessel, (iv) transmitter identifier information, and (v) vessel location information for the vessel. The method can also include determining that there is a leak condition for the vessel based on the data sent by the tracking device and, in response to determining the leak condition is present, sending at least one notification concerning the leak condition to at least one user.

In a seventeenth aspect, embodiments of the method can include the transmitter device of the tracking device sending data indicating at least one of: (i) vessel identifier information, (ii) vessel capacity status information, (iii) fluid type information identifying a fluid stored in the vessel, (iv) transmitter identifier information, and (v) vessel location information for the vessel. Data related to a vessel can then be retrieved based on such data. For instance, the data can be retrieved based on a cross-referencing of data that is determinable from the vessel identifier sent by the transmitter device of the tracking device. In some implementations, the retrieved data can include at least one of: a Safety Data Sheet (SDS) of the vessel or for the fluid retained in the vessel, vessel retest date information, a fluid expiration date for fluid retained in the vessel, contents of the fluid within the vessel, a certificate of analysis (CofA), and/or a certificate of conformity (CoC). For example, a remote management system can receive data from the tracking device, retrieve vessel related information and subsequently communicate the retrieved information to a user device for output of the retrieved information, or data, to the user. The output can be provided in one or more notifications and/or via at least one display provided by a graphical user interface that can be generated by a user device based on data the user device receives from the remote management system.

In an eighteenth aspect, the method of the twelfth aspect can be combined with one or more of the thirteenth through seventeenth aspects. For example, the method of the twelfth aspect can be combined with the one or more of the thirteenth aspect, fourteenth aspect, fifteenth aspect, sixteenth aspect, and seventeenth aspect. As another example the twelfth aspect can include all the features of the above noted thirteenth through seventeenth aspects or only a selected set of such features. As yet another example, such an embodiment of the eighteenth aspect can include utilization and use of an apparatus of any of the first through eleventh aspects discussed above.

Other details, objects, and advantages of compressed fluid vessels, apparatuses for monitoring and/or tracking such vessels, methods of monitoring such vessels, methods of providing such vessels, methods for distribution and/or inventory management of such vessels as well as methods of making and using such vessels and apparatuses will become apparent as the following description of certain exemplary embodiments thereof proceeds.

BRIEF DESCRIPTION OF THE DRAWINGS

Exemplary embodiments of compressed fluid vessels, apparatuses for monitoring and/or tracking such vessels, methods of monitoring such vessels, methods of providing such vessels, methods for distribution and/or inventory management of such vessels as well as methods of making and using such vessels and apparatuses are shown in the drawings included herewith. It should be understood that like reference characters used in the drawings may identify like components.

DETAILED DESCRIPTION

Figure 1:
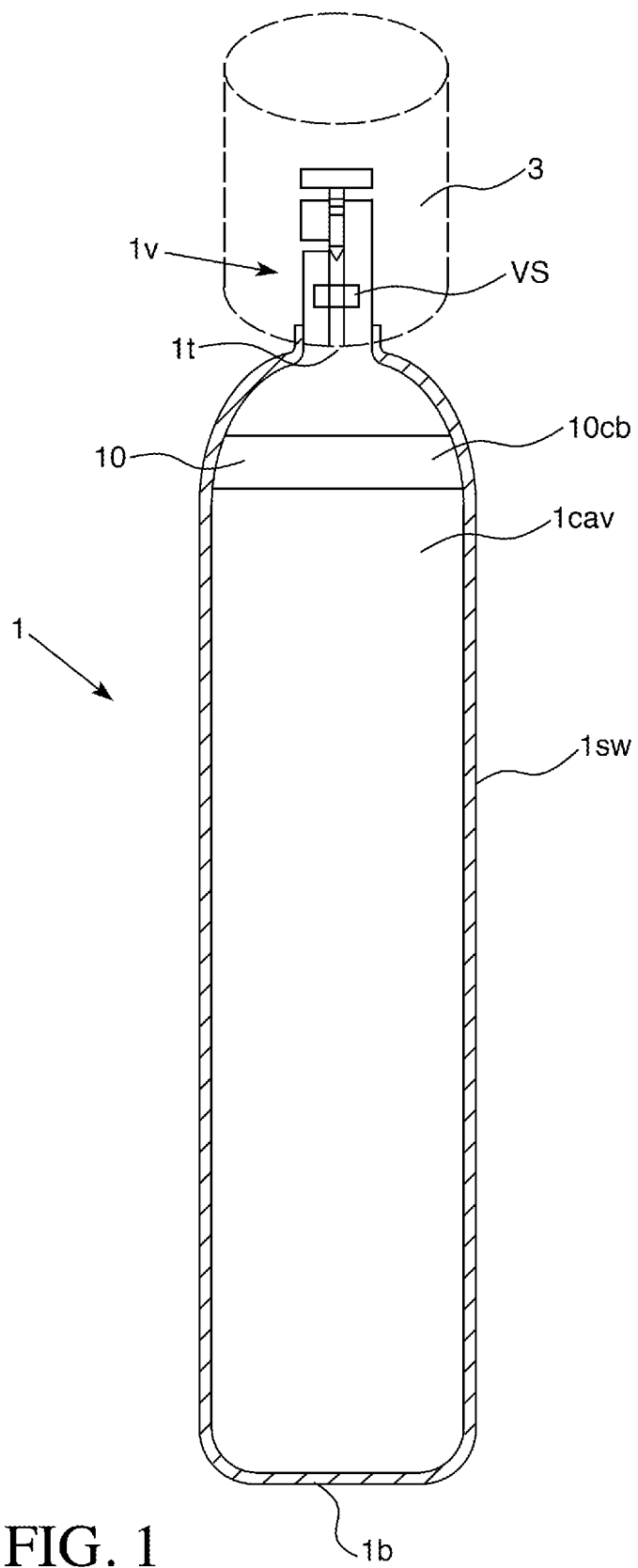
FIG. 1 is a schematic view of an exemplary embodiment of a compressed fluid vessel having an exemplary embodiment of a tracking device 10 of a monitoring apparatus.

Referring to FIGS. 1-15, a monitoring apparatus 100 can be configured to monitor and/or track compressed fluid vessels 1 (e.g. gas cylinders and the like, etc.) to facilitate use and inventory management for the vessels. As may best be seen from FIGS. 1-2, each of the compressed fluid vessels 1 can include a body that defines a cavity 1cav. The body can have a top 1t and a bottom 1b opposite the top. At least one sidewall 1sw can extend from the bottom to the top to define the cavity 1cav. The cavity 1cav can be sized to retain a pressurized fluid (e.g. compressed gas, liquefied gas, etc.).

The vessel 1 can also include a valve 1v. A protective covering 3 can be positionable adjacent a top 1t or on the top 1t of the vessel 1 to protect the valve 1v. The valve 1v can include a regulator and other elements to facilitate the output of fluid from the cavity 1*cav* and/or filling of the cavity 1*cav* with fluid. The fluid can be a gas, a liquid, or a mixture of gas and liquid. The protective covering 3 can be positionable over the valve 1*v* to protect the valve and related components during shipment or storage.

In some embodiments, the protective covering can be a guard or other type of protective enclosure device, for example. The protective covering 3 can be removed from the valve 1*v* to facilitate use of the vessel 1 (e.g. passing the compressed fluid out of the cavity 1*cav* for use of that fluid).

A tracking device 10 can be connected to the body of the vessel 1. The tracking device 10 can be structured as a collar for attachment to the body of the vessel 1, for example. The tracking device 10 can be configured to track the location of the vessel 1 as well as monitor, or track, the fluid (e.g. gas) capacity level within the vessel cavity 1*cav*. The tracking device 10 can also be configured to determine whether the vessel is in use and communicate information about the vessel's use. Such communicated data can include communication of data obtained from one or more sensors VS connected to the vessel (e.g. a pressure sensor, density sensor and/or liquid level sensor), for example. The tracking device 10 can be communicatively connected to the one or more sensors to receive the sensor data and transmit the sensor data out along with other data or information (e.g. vessel identifier, transmitter identifier, sensor identifier, location information, etc.).

The tracking device 10 can include at least one sidewall 10*sw*. For example, a first sidewall 10*sw* can be connected to a second sidewall to define a collar body of the tracking device. The formed collar body can include an outer surface 10*a* that can be the exterior surface of the collar or a portion of the exterior surface of the collar body. The outer surface 10*a* can have a slot 10*sl* defined therein. The slot 10*sl* can be structured as a window for display of indicia and/or for location of a display (Disp).

The collar body 10*cb* of the tracking device 10 can have an upper opening 10*c* adjacent the top of the collar body 10*cb* or at the top of the collar body 10*cb* that is in communication with a bottom opening 10*b* that is adjacent the bottom of the collar body or at the bottom of the collar body. An inner surface 10*d* of the collar body 10*cb* can define a cavity 10*cav* between the upper opening 10*c* and bottom opening 10*b*. The cavity 10*cav* can be sized and shaped to receive a portion of the vessel body for the tracking device's attachment to the vessel 1. Attachment of multiple sidewalls 10*sw* together can be utilized to attach the tracking device 10 to the vessel body by attaching the sidewalls 10*sw* together at or adjacent a neck of the body of the vessel 1 so the neck of the body of the vessel is retained within the cavity 10cav, for example. The upper and bottom openings 10*c* and 10*b* can be sized so an upper portion of the vessel body extends away from the tracking device via the upper opening 10*c* and a lower portion of the vessel body extends away from the tracking device via the bottom opening 10*b* when the tracking body is coupled to the vessel body and a portion of the vessel body is within the cavity 10*cav* of the tracking device 10.

The sidewalls 10*sw* can be removably coupled together so that the sidewalls 10*sw* can be separated to open the collar body to remove the tracking device 10 from the vessel 1. The tracking device 10 can then be reattached to the vessel or attached to a different vessel body by re-coupling the sidewalls 10*sw* together to position the tracking device on or adjacent a neck of the body of the vessel 1, for example. A releasable attachment mechanism can be utilized for attachment of the sidewalls 10*sw*. Such mechanisms can include interlockable components that are resiliently moveable to release attachment between interlocked components, mechanical coupling that can be locked or unlocked via movement of a key or other locking element of the coupling mechanism, or other type of releasable attachment mechanism. Other types of attachment mechanisms that can be utilized can include attachment mechanisms that are configured in such a way that if the collar body of the tracking device 10 is removed from the vessel, it cannot be reattached (e.g. the collar body must be broken or fractured to separate the tracking device 10 from the body of the vessel 1).

Figure 15:
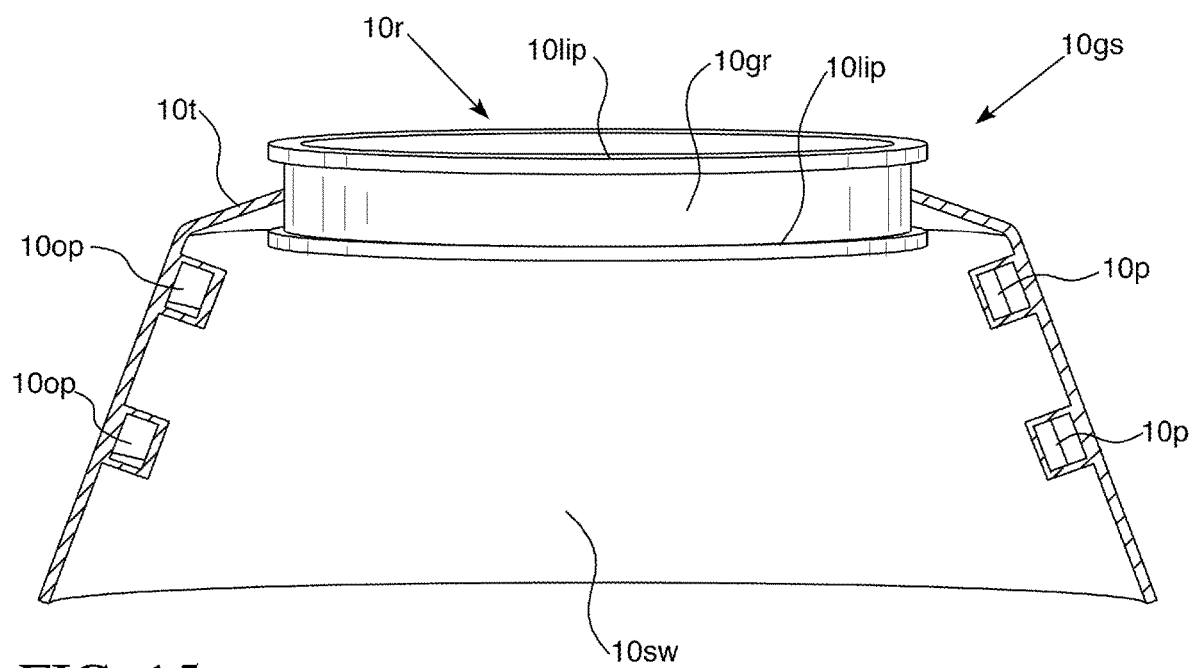
FIG. 15 is a cross-sectional view of the exemplary embodiment of a tracking device 10 of a monitoring apparatus.

One example of the releasable attachment mechanism that can be used to connect sidewalls 10*sw* together to form the collar body 10*cb* may best be appreciated from FIG. 15. Each sidewall 10*sw* can include a first side that has openings 10*op* and a second side that has prongs 10*p*. The openings 10*op* can include upper and lower openings 10*op* and the prongs 10*p* can include upper and lower prongs.

A lower prong 10*p* of a first sidewall extending from its second side can be sized and configured to resiliently pass into the lower opening 10*op* of a first side of a second sidewall for a mating interconnection therein. A lower prong 10*p* of a second sidewall extending from its second side can be sized and configured to resiliently pass into the lower opening 10*op* of a first side of a first sidewall for a mating interconnection therein.

An upper prong 10*p* of a first sidewall 10*sw* extending from its second side can be sized and configured to resiliently pass into the upper opening 10*op* of a first side of a second sidewall for a mating interconnection therein. An upper prong 10*p* of a second sidewall 10*sw* extending from its second side can be sized and configured to resiliently pass into the upper opening 10*op* of a first side of a first sidewall for a mating interconnection therein.

The example of FIG. 15 is exemplary. Other embodiments can include more or less prongs 10*p* and openings 10*op* (e.g. each sidewall 10*sw* may only have one prong 10*p* and one opening 10*op* or may have more than two openings 10*op* and more than two prongs 10*p*).

It should also be appreciated that the prongs 10*p* can be considered protrusions, arms, legs, or other insertable structure insertable within an opening 10*op* for a resilient mating attachment within the opening 10*p*. Each opening 10*op* can be defined to facilitate resilient interlocking with the prong. The distal end of each prong can be sized and configured to resiliently mate with structure defined in the opening 10*op*.

Figure 2:
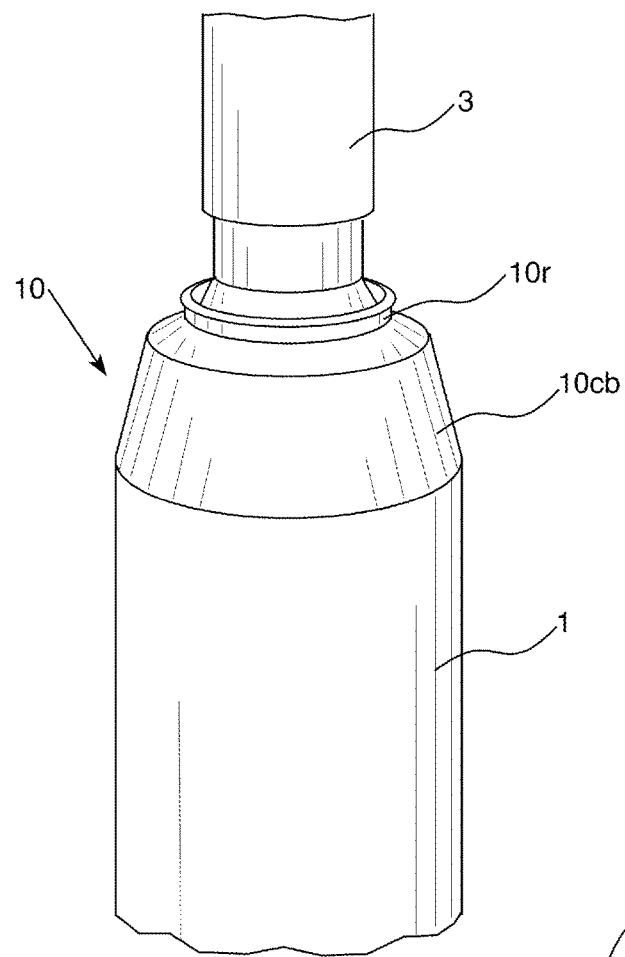
FIG. 2 is a perspective view of the exemplary embodiment of the compressed fluid vessel having the exemplary embodiment of a tracking device 10 of a monitoring apparatus.
Figure 3:
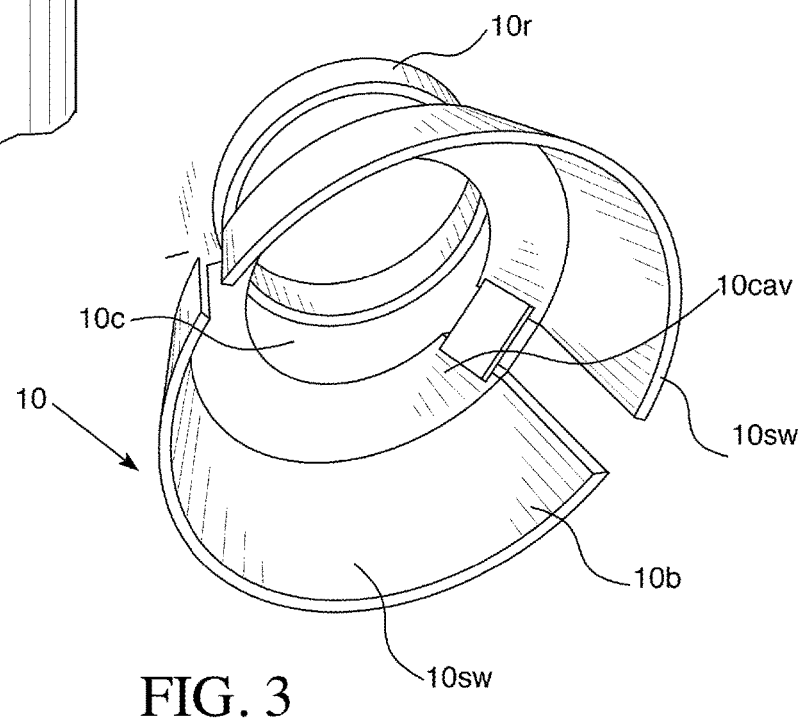
FIG. 3 is an exploded view of the exemplary embodiment of the tracking device of the monitoring apparatus shown in FIGS. 1 and 2.
Figure 4:
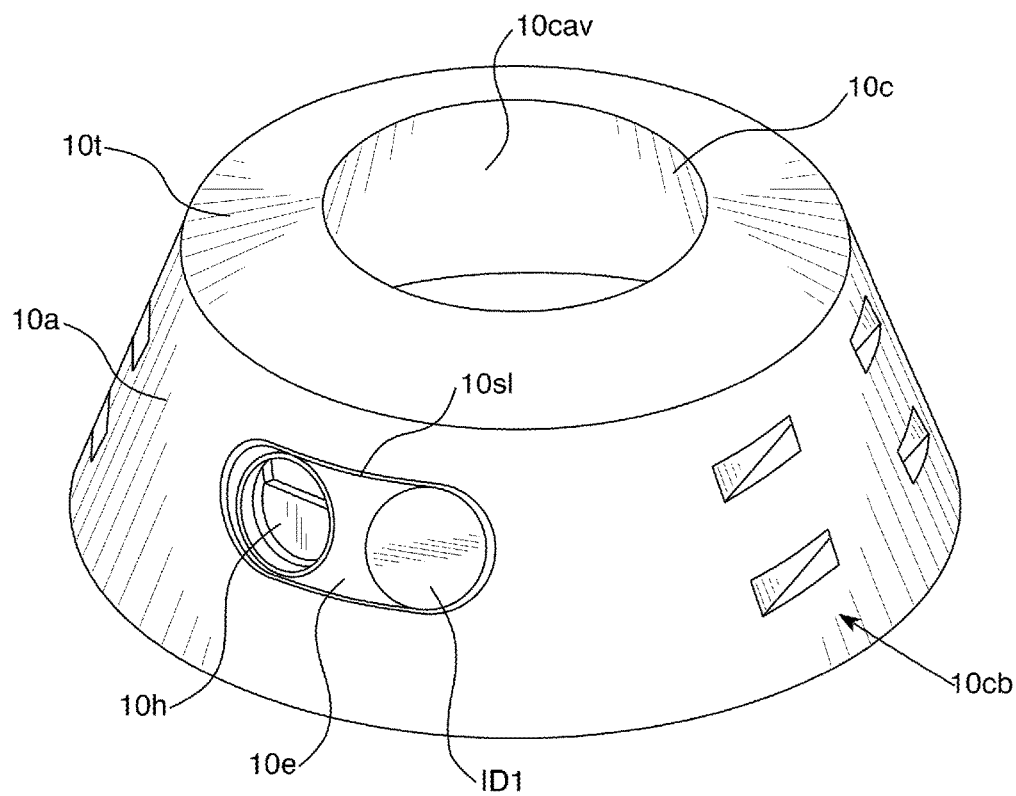
FIG. 4 is a perspective view of the exemplary embodiment of the tracking device with a capacity indicator in a filled indication position.
Figure 5:
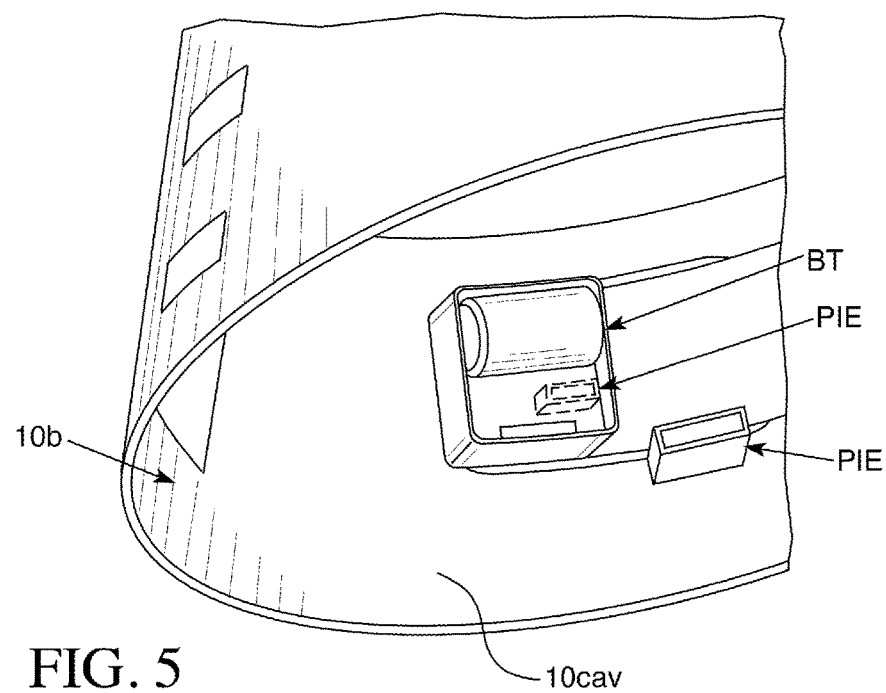
FIG. 5 is a perspective inner view of the exemplary embodiment of the tracking device 10 with the capacity indicator in the filled indication position.
Figure 6:
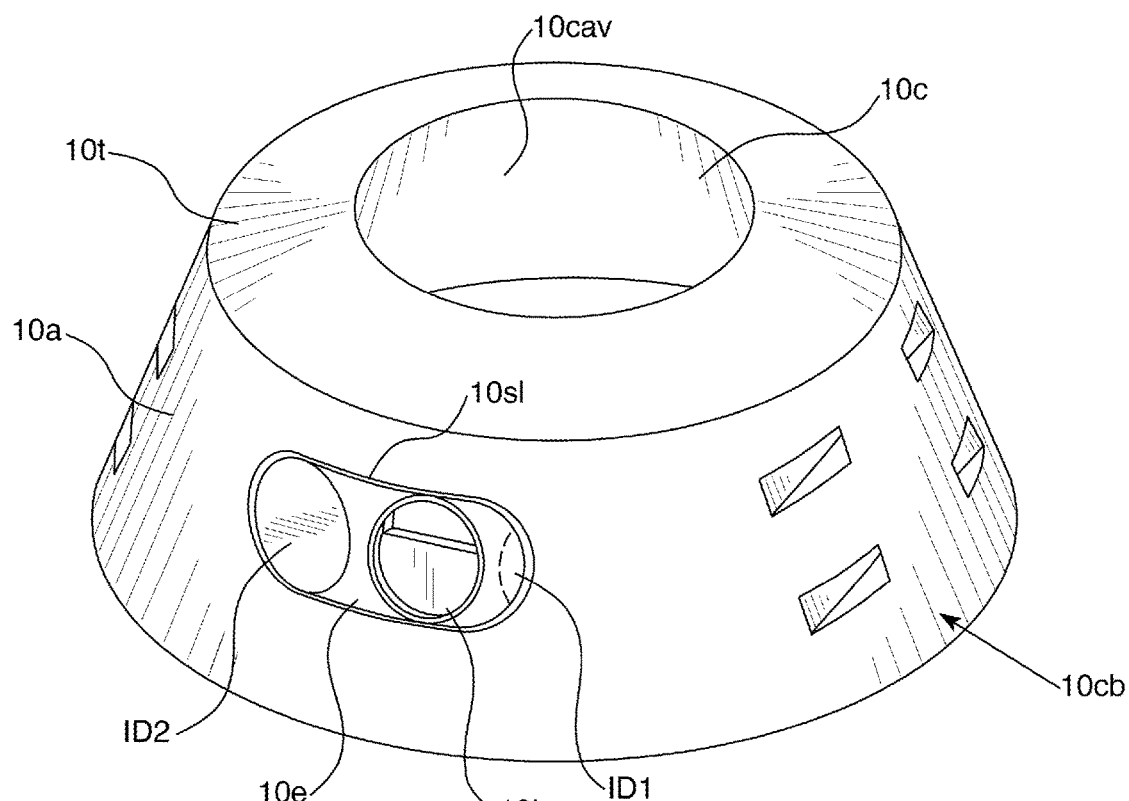
FIG. 6 is a perspective view of the exemplary embodiment of the tracking device with a capacity indicator in an empty indication position.
Figure 7:
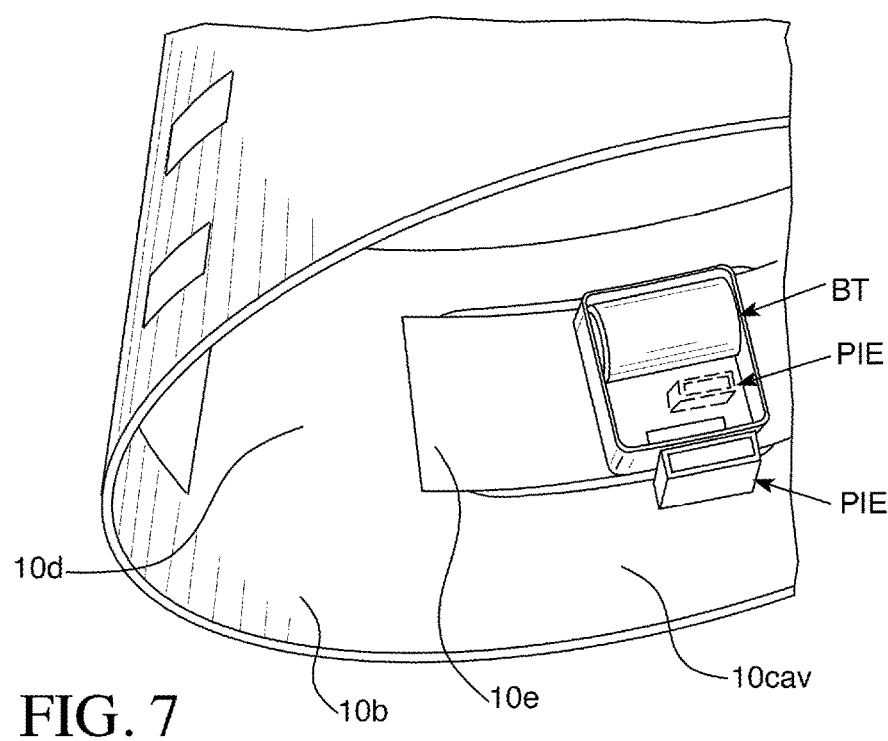
FIG. 7 is a perspective inner view of the exemplary embodiment of the tracking device 10 with the capacity indicator in the empty indication position.
Figure 8:
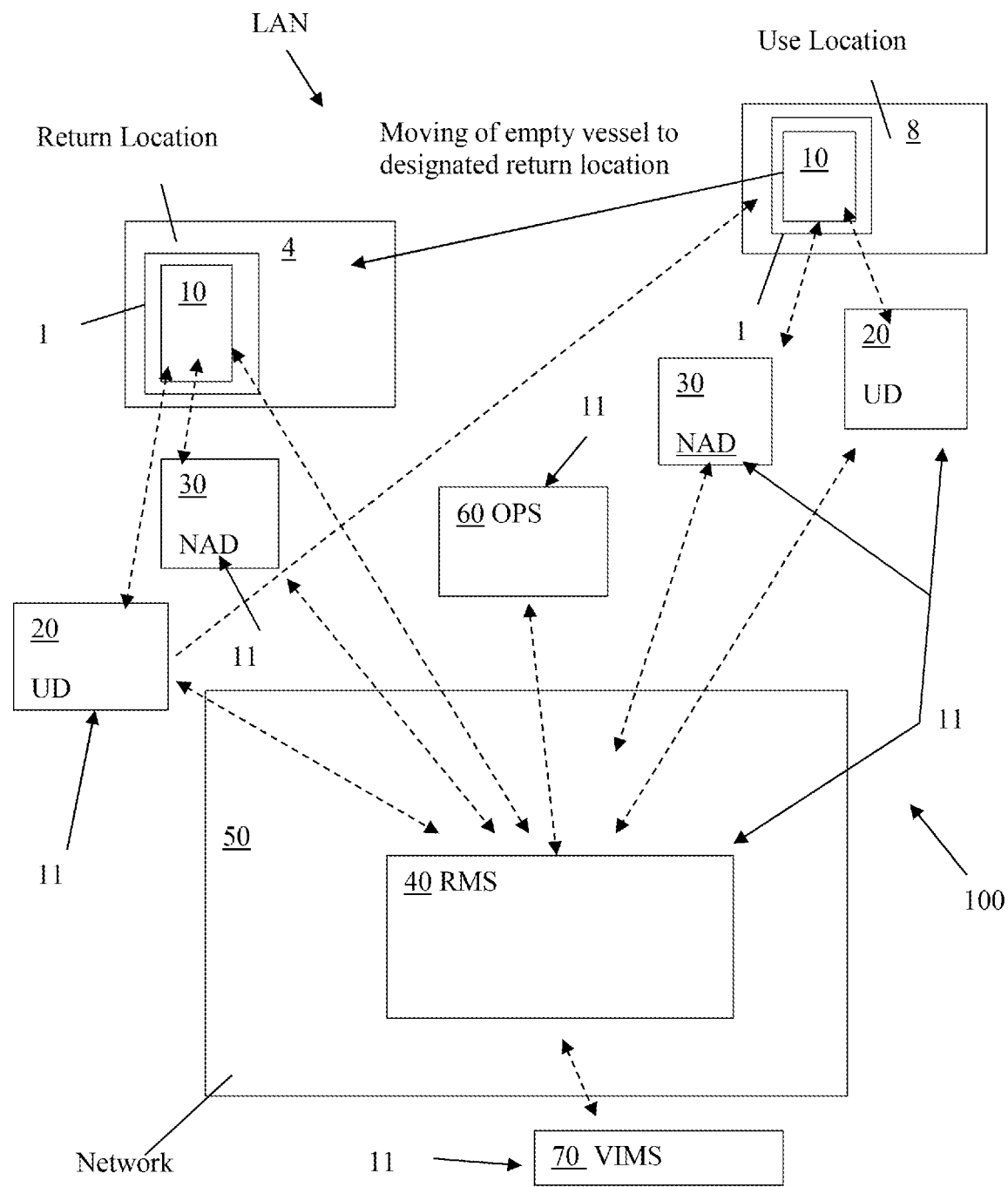
FIG. 8 is a block diagram of an exemplary embodiment of the monitoring apparatus 100.
Figure 9:
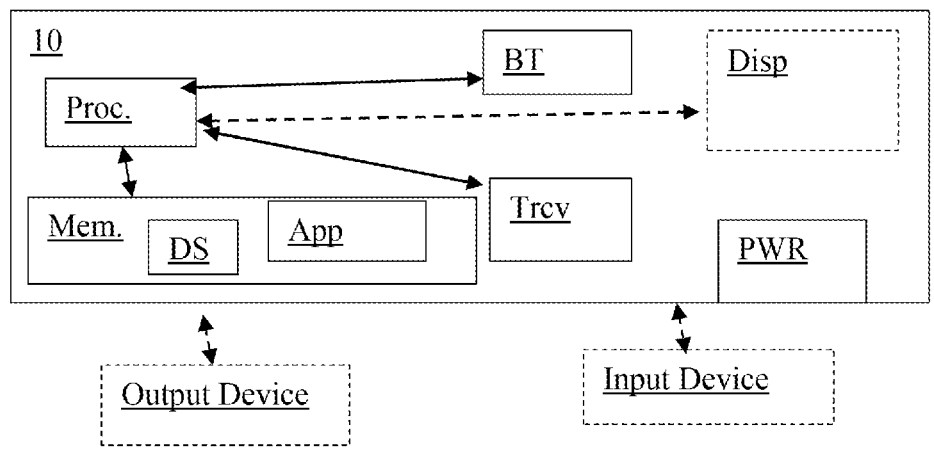
FIG. 9 is a block diagram of the exemplary embodiment of the tracking device 10.
Figure 10:
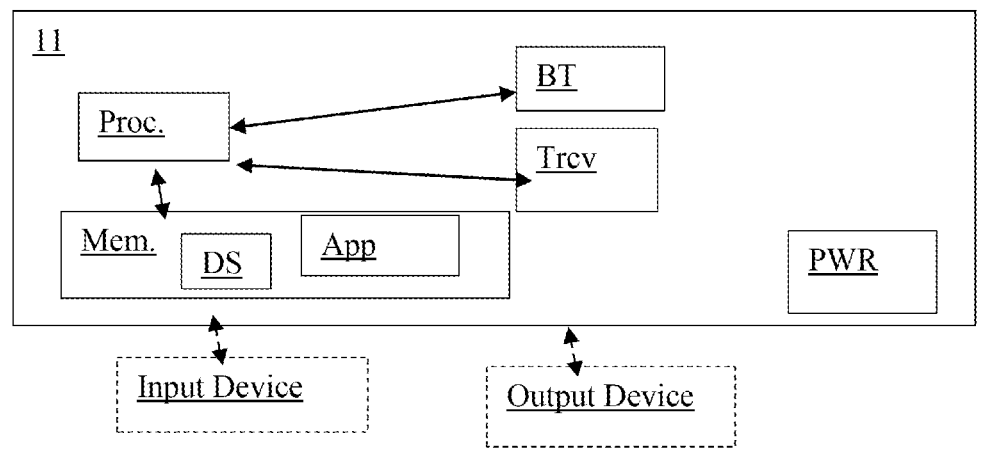
FIG. 10 is a block diagram of an exemplary embodiment of computer devices 11 that can be included in the exemplary embodiment of the monitoring apparatus 100.

The collar body 10*cb* of the tracking device 10 that is formed can position the tracking device 10 around a neck of the vessel or another part of the body of the vessel 1, as can be appreciated from FIG. 2, for example. The tracking device can include at least one attachment ring 10*r*. Each attachment ring 10*r* can be an annular structure (e.g. circular shaped ring, elliptical shaped ring, annular polygonal shaped ring, etc.) configured to facilitate attachment of a collar body of the tracking device 10 to a body of the vessel 1 (e.g. adjacent or on a neck of the vessel, etc.). The attachment ring 10*r* can be comprised of a resilient material (e.g. polymeric material, elastomeric material, etc.) to permit the ring 10*r* to facilitate attachment to a variety of different vessels designs so that the tracking device 10 can be releasably attachable to a number of different vessel designs.

For example, the attachment ring 10*r* can include an annular body that is sized and configured to fit around a neck of the vessel body and provide a standard interface for the collar body 10*cb* of the tracking device 10 for attachment to the vessel body. The attachment ring 10*r* can be configured to have a fixed position on the vessel 1 so that the collar body can be rotatable about the ring 10*r* when the ring 10*r* is attached around the neck of the vessel body so that the tracking device 10 can rotate about a longitudinal axis of the vessel body (e.g. the collar body of the tracking device can rotate about a circumference or perimeter of the vessel body along a rotational path defined by the attachment ring 10*r*). For some sized vessel bodies, multiple attachment rings 10*r* can be attached together to provide a fit for a wider range of vessel bodies to account for narrower sized vessel bodies, for example. In other situations, multiple different sized attachment rings 10*r* can be provided so that a single attachment ring 10*r* can be selected for attachment to the body of the vessel 1 that has the appropriate sizing for being positioned around a neck of the vessel or adjacent the neck of the vessel 1.

An attachment ring 10*r* can include structure to facilitate attachment of the one or more attachment rings 10*r* to the one or more sidewalls 1*sw* of vessel 1. For example, an attachment ring 10*r* can include deformable or resilient tabs 10*r*T that extend from the attachment ring 10*r* for insertion into holes defined in a sidewall 1*sw* of the vessel and/or for engaging the sidewall 1*sw* of the vessel (e.g. directly contacting the sidewall 1*sw*, being in engagement with the sidewall 1*sw*, etc.) for being positioned around the vessel for attachment to the vessel 1. As another example, fasteners 10*r*F (e.g. screws or bolts) can be passed through the sidewall(s) 10*sw* and body of each attachment ring 10*r* for fastening the at least one attachment ring 10*r* to the vessel 1 and/or for being brought into a tight interference position with the body of the vessel to clamp onto the vessel 1 via an interference fit provided by the engagement of a distal ends of the fasteners contacting the body of the vessel (e.g. direct contact by the distal ends of the fasteners on the one or more sidewalls 1*sw* of the vessel).

Examples of such fasteners 10*r*F can include threaded bolts or screws that each have a head opposite its distal end for a tool or user's hand to be utilized to drive rotation of the screw or bolt. The engagement of the fasteners 10*r*F with the vessel body can be adjustable by rotation of the fasters to loosen or tighten their engagement with the body of the vessel 1. The attachment ring 10*r* can be loosened via loosening of the fasteners 10*r*F so that the fasteners no longer engage the vessel body so the attachment ring 10*r* can be removed from the vessel body or positioned at a more desired location on the vessel body. The fasteners 10*r*F can be tightened to position the attachment ring 10*r* at a desired location on the vessel body and/or for attachment of the attachment ring 10*r* to the vessel body. The loosening and tightening of the fasteners 10*r*F can facilitate releasable attachment of the attachment ring 10*r* to the body of the vessel 1 and can facilitate releasable attachment of the collar body 10*cb* to the vessel body as well.

The collar body 10*cb* can be positionable on the attachment ring 10*r* after it is attached to the vessel body such that the collar body is rotatable relative to the vessel about a rotational path of motion defined by the attachment ring 10*r*. As may best be appreciated from FIG. 15, the attachment ring 10*r* can include a guide structure 10*gs* (e.g. at least one lip 10lip or other structure) that can be defined on the attachment ring 10*r* to facilitate retaining the collar body on the attachment ring 10*r* and permitting rotation of the collar body about the attachment ring 10*r*, for example. The guide structure 10*gs* can define the path of motion for the collar body or help retain the collar body on the attachment ring.

For example, the guide structure 10*gs* can include at least one lip 10lip that is defined at a bottom and/or top of the body of the attachment ring 10*r*. Instead of top and bottom locations, there can instead be an upper lip and a lower lip positioned near the top and bottom of the body of the attachment ring (e.g. an upper lip can include a top lip an may also be at a position that is lower than the top of the attachment ring 10*r* in an upper portion of the body of the attachment ring 10*r* and the lower lip can be a bottom lip or may be a lip that is above the bottom of the attachment ring 10*r* and in a lower portion of the body). A lip 10lip can extend along an entire periphery of the upper portion of the body of the attachment ring and/or can extend along an entire periphery of a lower portion of the body of the attachment ring 10*r*, for example. A groove 10 gr can be defined above the lower lip 10lip and/or below an upper lip 10lip. An upper portion 10*t* of the collar body 10*cb* (e.g. its top portion or an upper portion that may include or be near its top) can be sized and configured to be positionable within the groove 10 gr and be retained within the groove 10 gr via the lower lip 10lip. An upper lip 10lip, when present, can also function to help retain the upper portion 10*t* of the collar body 10*cb* in the groove for attachment to the attachment ring 10*r*. The upper portion 10*t* of the collar body 10*cb* can have an interference fit attachment that permits the collar body 10*cb* to rotate along an outer periphery, or circumference, of the attachment ring along a path of travel defined by the groove 10 gr and/or lip(s) 10lip. The upper portion 10*t* of the collar body 10*cb* can engage and/or contact the body of the attachment ring within the groove 10 gr and/or lower lip 10lip and can be slid or otherwise moved in a first direction along the groove 10 gr. The upper portion 10*t* of the collar body 10*cb* can engage and/or contact the body of the attachment ring within the groove 10 gr and/or lower lip 10lip and can be slid or otherwise moved in a second direction along the groove 10 gr as well. This second direction of motion can be opposite the first direction of motion (e.g. the first direction can be counterclockwise and the second direction can be clockwise or the first direction can be clockwise and the second direction can be counterclockwise).

The upper portion 10*t* of the collar body 10*cb* can be fitted within the groove 10 gr of the attachment ring 10*r* such that a lower lip 10lip prevents the collar body 10*cb* from being separated from the attachment ring 10*r*. To dislodge or remove the collar body 10*cb* from the attachment ring 10*r*, the sidewalls 10*sw* of the collar body 10*cb* may be separated by removal of prongs 10*p* that extend from a sidewall for matingly interlocking within openings 10*op* of the other sidewall 10*sw* to which the sidewall releasably connects, for example. Other collar body 10*cb* embodiments can utilize other type of releasable attachment mechanisms or a combination of such mechanisms (e.g. screws or bolts can be included to help provide a releasable attachment of the sidewalls 10*sw* together to form the collar body 10*cb*, another type of mating interconnection mechanism can be defined in opposite sides of the sidewalls for interconnection, etc.).

A moveable indicator element 10*e* can be moveably attached to the one or more sidewalls 10*sw* so that the indicator element 10*e* is moveable along portions of the sidewalls 10*sw*. The moveable indicator element 10*e* can be a moveable ring, a moveable slide, rotatable disk, a rotatable plate, a moveable plate, or other moveable member having indicia thereon to indicate different states of the vessel 1 (e.g. a filled state, an empty state, etc.).

The moveable indicator element 10*e* can include an actuation element 10*h* that can be positioned between a full capacity indicia ID1 and an empty indicia ID2. For example, the actuation element 10*h* can be structure as a cavity, or a protrusion that can extend from the moveable indicator element 10e, or a cavity with one or more protrusions that can extend from the moveable indicator element 10e so a tool or user's finger or hand can engage the actuation element 10h to move the moveable indicator element between multiple different positions. The actuation element 10h can be sized to permit a user to place a finger or tool into a cavity or on a protrusion to drive motion of the moveable indicator element 10e to adjust how the indicia ID1, ID2, and actuation element 10h are positioned relative to a slot 10sl.

A plurality of capacity indicia ID1, ID2 can be attached to the moveable indicator element 10e so that movement of the moveable indicator element 10e can adjust which capacity indicia is being displayed to a user via the slot 10sl. The slot 10sl can be defined in one or more of the sidewalls 10sw of the collar body of the tracking device 10. The capacity indicia can include a full capacity indicia ID1 (which can also be considered a filled capacity indicator or a full indicator) and an empty indicia ID2 (which can also be considered an empty indicator).

The indicia attached to or otherwise provided on the moveable indicator element 10e can also include an in-use indicia. The in-use indicia can indicate the vessel 1 is currently outputting fluid (e.g. gas, mixture of gases, mixture of at least one gas and at least one liquid, etc.) via its valve 1v or is connected to a device or system for outputting the fluid from the cavity 1cav via its valve 1v. In some configurations, the actuation element 10h can be configured to also function as an in-use indicia so its position can also (or alternatively) indicate the vessel 1 is not currently empty and is also not currently full (e.g. is between an empty level and a full level).

The full capacity indicia ID1, actuation element 10h, and empty indicia ID2 can be positioned on the moveable indicator element 10e so such indicia can be viewable through the slot 10sl to visually indicate to a user a status of the vessel 1. For instance, the moveable indicator element 10e can be moveable to adjust a position of the indicia so different indicia are in different positions to indicate different vessel statuses. In a first position (which can be considered a full capacity indication position or a filled capacity indication position), the full capacity indicia ID1, which can also be considered a full indicator, can be seen via the slot 10sl to indicate the vessel is full and available for use. In embodiments where the actuation element 10h is not also functioning as in-use indicia, a separate in-use indicia may not be visible when the moveable indicator element 10e is in its first position. In some embodiments, when the actuation element 10h also functions as the in-use indicia or when a different indicator is used as such indicia, the in-use indicia may also be visible when the moveable indicator element 10e is in this first position. The empty indicator ID2 may not be viewable through the slot 10sl and may be covered by a portion of a sidewall 10sw when the moveable indicator element 10e is in the first position.

In a second position of the moveable indicator element 10e, the in-use indicia (which can also be considered an in-use indicator) can be visible via the slot 10sl to indicate that the vessel is in use. The full capacity indicator ID1 can be shown or visible with the in-use indicia or may be hidden from view when the moveable indicator element 10e is moved to this second position. The empty indicator ID2 may not be viewable through the slot 10sl and may be covered by a portion of a sidewall 10sw when the moveable indicator element 10e is in the second position.

In a third position of the moveable indicator element 10e (which can be considered an empty indication position or an empty indicator position), the empty indicator ID2 can be visible via the slot 10sl to indicate that the vessel is empty. The in-use indicia can be shown or visible with the empty indicator ID2 to function as an in use and empty indicator or may be hidden from view when the moveable indicator element 10e is moved to this third position to provide an empty indicator. The full capacity indicator ID1 may not be viewable through the slot 10sl and may be covered by a portion of a sidewall 10sw when the moveable indicator element 10e is in the third position.

In some embodiments, the moveable indicator element 10e can be moveable so that there are only two indication positions instead of more than two such positions. In such embodiments, the first position of the moveable indicator element 10e can be similar to the above discussed position. The second position, however, can be the empty indication position or empty indicator position (e.g. there may not be a separate in-use position between the empty and full indication positions). In such embodiments, the second position of the moveable indicator element 10e can be considered an empty indication position or an empty indicator position and can be configured so that the empty indicator ID2 can be visible via the slot 10sl to indicate that the vessel is empty while the full capacity indicator ID1 may not be viewable through the slot 10sl and may be covered by a portion of a sidewall 10sw when the moveable indicator element 10e is in the empty indication position or empty indicator position.

When the moveable indicator element 10e is in the empty indication position or empty indicator position, a wireless transmitter device BT attached to an interior side of the moveable indicator element 10e can be positioned so it is in electrical connection with a power source to power the transmitter device BT to emit a signal or communicate a pre-defined set of data to indicate the vessel is empty and/or needs to be replaced. When the moveable indicator element 10e is not in the empty indication position or empty indicator position (e.g. is in its first position or in another non-empty indicator position), the transmitter device BT can be disconnected or positioned so it is decoupled from the power source so it is unable to transmit data or a signal. For example, the wireless transmitter device BT can be moved into and out of electrical contact with a positional indicator element PIE that can be positioned so that it is in contact with and/or in electrical connection with the wireless transmitter device BT when the moveable indicator element 10e is moved to its empty indication position to receive power for actuating the wireless transmitter device BT to emit the signal and/or data concerning an empty state of the vessel 1 and it not be in such contact or electrical connection with the wireless transmitter device BT when the moveable indicator element 10e is in other positions (e.g. its first position) so the wireless transmitter device BT does not emit signal or data about a non-empty state of the vessel. In other configurations as discussed herein, the wireless transmitter device BT can always be powered on for transmission of data or can be connected to a power source for regular periodic transmissions of data and the positional indicator element PIE can be utilized to trigger adjustment of the information included in the data or signal output by the wireless transmitter device BT when the moveable indicator element 10e is moved to the empty indication position.

In some configurations, the wireless transmitter device BT can always be coupled to a power source so the transmitter device BT can be powered on, but be adjustable between a sleep mode or lower activity mode and an active mode. The periodic cycling between the sleep mode and an active mode can occur at pre-defined time intervals and the wireless transmitter device BT can send data when in the active mode and subsequently not emit data when in the sleep mode or lower activity mode. The data sent when the transmitter device BT is in the active mode can include the sensor data and/or vessel position data, filled indication data, and/or other data as discussed herein.

The moveable indicator element 10e and indicia can be configured so that a user can manually adjust the position of the moveable indicator element 10e. Such motion can be actuated by the user using a hand or finger to directly contact the moveable indicator element 10e to move it. Such motion can alternatively be caused by the user manipulating a switch or handle (not shown) connected to the moveable indicator element 10e so that movement of the switch or handle caused by the user drives motion of the moveable indicator element 10e. The switch or handle can be connected to the moveable indicator element 10e to drive rotational motion or linear motion of the moveable indicator element 10e to adjust which indicia is shown for indicating a different use of capacity status of the vessel 1 (e.g. the moveable indicator element 10e can be slideable linearly in first and second directions for back and forth motion, slideable in first and second rotational directions such as clockwise and counterclockwise directions, slideable in just a single rotational direction, etc.).

As mentioned above, the tracking device 10 can also include a wireless transmitter device BT. The wireless transmitter device BT can be attached to the interior side of the moveable indicator element 10e that faces toward the cavity 10cav of the tracking device 10 and is opposite the exterior side of the moveable indicator element 10e that faces outwardly away from the cavity 10cav of the tracking device 10 on which the indicia ID1, ID2, and actuation element 10h (which can also function as an in-use indicator as discussed herein) are positioned. The transmitter device BT can be connected to the moveable indicator element 10e so that when the empty indicator ID2 is in a pre-selected position that corresponds to indicating an empty or near empty condition of the cavity 1cav of the vessel 1, the transmitter element is activated to transmit a signal or data to indicate the vessel 1 is empty and needs replaced with a new vessel that is full. For example, the transmitter device BT can be attached to the interior side of the moveable indicator element 10e so it is at a location coincident with the empty indicia ID2 (which can also be referred to as an empty indicator) and is moved into electrical contact, magnetic contact, or other type of engagement with the positional indicator element PIE when the moveable indicator element 10e is in the empty indication position or empty indicator position. As another example, the transmitter device BT can be attached to the interior side of the moveable indicator element 10e so that when this element is in its empty indication position to allow the empty indicia ID2 to be viewable via the slot 10sl to indicate the vessel is empty, the transmitter device BT is electrically connected to the positional indicator element PIE for powering the transmitter device BT and/or for adjusting the data or signal output by the transmitter device BT.

The transmitter device BT can be connectable with or communicatively connectable with the positional indicator element PIE. The positional indicator element PIE can include a position sensor, which can be utilized to adjust the data or signal output from the transmitter device. The positional indicator element PIE can include a magnetic sensor, an optical sensor, an accelerometer, a potentiometer, a linear position sensor and/or a rotary position sensor. The transmitter device positional data communicable between the positional indicator element PIE and the transmitter device BT can be utilized to adjust data transmitted by the transmitter device to indicate the vessel is full or empty as discussed herein, for example.

The positional indicator element PIE can also be a location reference point element. Such an element can include a magnet, an electrical contact, an optically reflective surface (specular or diffuse), or an optically absorbing surface, for example. A positional sensor of the wireless transmitter device BT can interact with the location reference point to trigger detection of the location reference point PIE and actuate a change to the transmitter device BT by adjusting its power mode to the active mode and/or adjust the data transmitted by the transmitter device to indicate the vessel is full or empty as discussed herein. The transmitter device BT can utilize such a mechanism to detect the location of the moveable indicator element 10e having been changed to indicate the vessel 1 is empty to adjust the data that it transmits, for example. When the transmitter device BT detects the positional indicator element PIE, the data sent by the transmitter device BT can be adjusted to include an empty indication or other emptiness information, for example. Such a detection can occur by the transmitter device detecting the positional indicator element PIE being within range of its positional sensor, for example. When the positional indicator element PIE is not detected (e.g. is not within the range of the transmitter device's positional sensor), the transmitter device transmission of data can be adjusted so that no emptiness information or empty indicator is transmitted with other data to be transmitted by the transmitter device (e.g. identifier information, location information, sensor information, etc.).

Figure 13:
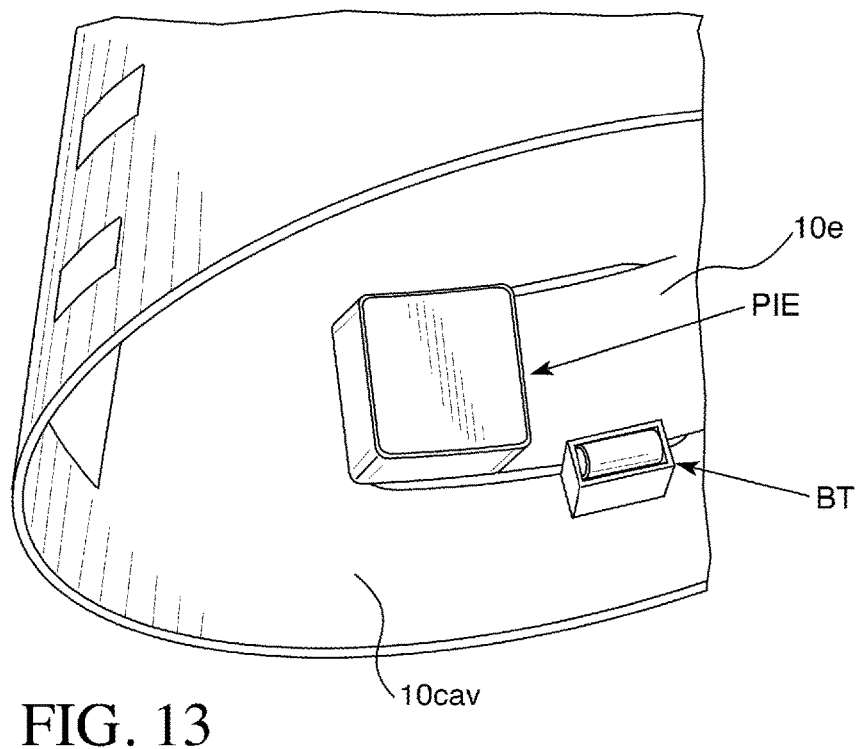
FIG. 13 is a perspective inner view of an exemplary embodiment of the tracking device 10 with the capacity indicator in the filled indication position.
Figure 14:
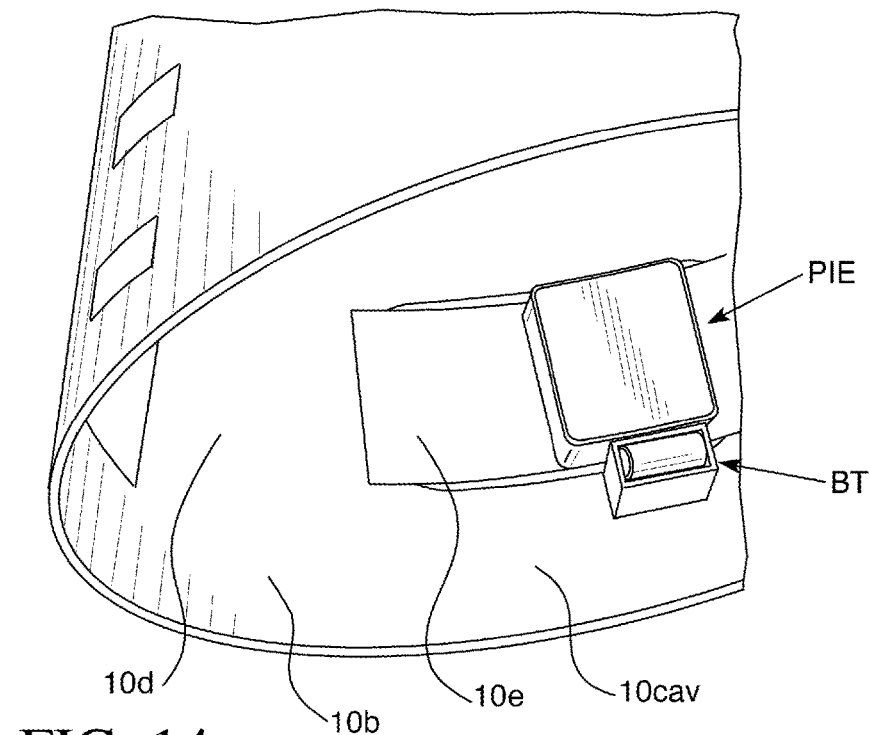
FIG. 14 is a perspective inner view of an exemplary embodiment of the tracking device 10 with the capacity indicator in the empty indication position.

In other embodiments, the position of the transmitter device BT and positional indicator element PIE in the tracking device 10 can be switched and the positional indicator element PIE can be attached to the moveable indicator element 10e and the transmitter device BT can be attached to a sidewall 10sw within the cavity 10cav or otherwise attached to a sidewall 10sw (e.g. positioned in the sidewall within the cavity 10cav, positioned in a compartment of the sidewall 10sw, etc.). FIGS. 13 and 14 illustrate an example of such a configuration. In such embodiments, the transmitter device's functionality can remain unchanged and can detect the position of the positional indicator element PIE via this element being within range of the positional sensor of the transmitter device that can occur via movement of the moveable indicator element 10e. The detection of the positional indicator element PIE can trigger the adjustment of the transmitter device's transmitted data and/or power usage mode in response to motion of the moveable indicator element 10e for displaying an empty indicator ID2 in the slot 10sl. When the moveable indicator element 10e is moved to display the full indicator ID1 or an in-use indication, the positional indicator element PIE can be sufficiently far away from the positional sensor of the transmitter device BT via the positional indicator element's attachment to the moveable indicator element 10e so that the transmitter device BT does not detect the positional indicator element PIE and the transmitter device BT is not actuated to provide empty indication information in any data it may transmit periodically while the moveable indicator element 10e is in position that does not indicate the vessel is empty. In situations where the transmitter device BT does not detect the positional indicator element PIE, the transmitter device BT may only send data about the location of the vessel (e.g. GPS data or just the signal strength associated with the transmitted data that can be used to determine the position of the vessel 1 as discussed herein) and/or vessel identification information (e.g. a vessel identifier, the transmitter device serial number, other identifier information, etc.), for example.

FIGS. 4-7 and 13-14 illustrate examples of moveable positioning for the wireless transmitter device BT and/or positional indicator element PIE and how that positioning can affect how the transmitter device BT can interact with the positional indicator element PIE to trigger an adjustment of data to be transmitted by the transmitter device BT and communicate the changes of the data to be transmitted by the transmitter device BT. As can be seen from FIGS. 4-7, the wireless transmitter device BT can be positioned so that when the use indicator or full indicator ID1 is positioned in the slot 10*sl* and viewable to users via the slot 10*sl* (e.g. not covered by exterior surface 10*a* of the sidewalls 10*sw*) to indicate that the vessel is full, in use, not empty, or not near being empty (e.g. is not at or below a pre-selected emptiness threshold or is above the pre-selected emptiness threshold, or is within a pre-selected fullness threshold, etc.), the transmitter device BT can be positioned away from a positional indicator element PIE so it is remote from the positional indicator element PIE (e.g., is not electrically connected to the positional indicator element PIE, is not in magnetic connection with the positional indicator element PIE, is not within a detectable range of the positional indicator element PIE, or is not within a detection range of the positional indicator element PIE for engagement with the positional indicator element PIE, etc.) and is either (i) not activatable to transmit a signal or data or (2) transmits data to indicate the vessel is full and/or in use (which can also include data or a signal that can identify a location of the vessel and/or sensor data of at least one sensor connected to the vessel). When the moveable indicator element 10*e* is moved to show the empty indicator ID2 (e.g. moved to its empty indication position or empty indicator position), the position of the transmitter device BT can be moved so it is in contact with the positional indicator element PIE, is electrically connectable to the positional indicator element PIE, is magnetically connectable or engageable with the positional indicator element PIE, and/or is within a detection range of the positional indicator element PIE so that the positional indicator element PIE can power the transmitter device BT so the transmitter device BT can emit a signal or data or otherwise interact with the transmitter device BT so that information included in the data or signal output by the transmitter device BT is adjusted to indicate the vessel is empty and/or needs replaced.

The signal or data that is emitted by the transmitter device BT can be transmitted wirelessly and include a pre-selected or pre-defined signal or data to indicate the vessel is empty and can also include other information (e.g. vessel identifier information, vessel capacity status information, vessel location information, etc.). For example, the communicated signal or data can include information such as a serial number or other identifier for the vessel, a serial number or other identifier for the transmitter device, pressure sensor data of a pressure sensor communicatively connected to the tracking device 10, a fill level of a liquid fill sensor connected to the vessel, a density data of a density sensor connected to the vessel, information indicating a gas that the vessel retained or retains, information indicating the vessel is in use and not empty or is empty, location information for the vessel, as well as other pre-defined information.

As can be seen from FIGS. 13-14 (and as discussed above), the positional indicator element PIE can be positioned so that when the use indicator or full indicator ID1 is positioned in the slot 10*sl* and viewable to users via the slot 10*sl* (e.g. not covered by exterior surface 10*a* of the sidewalls 10*sw*) to indicate that the vessel is full, in use, not empty, or not near being empty (e.g. is not at or below a pre-selected emptiness threshold or is above the pre-selected emptiness threshold, or is within a pre-selected fullness threshold, etc.), the positional indicator element PIE can be positioned away from a transmitter device BT so it is remote from the transmitter device BT (e.g., is not electrically connected to the transmitter device BT, is not in magnetic connection with the transmitter device BT, is not within a detectable range of the positional indicator element PIE, or is not within a detection range of a positional sensor or positional indicator element PIE of the transmitter device BT, etc.). When the positional indicator element PIE is not detected by the transmitter device BT, the transmitter device BT can be either (i) not activatable to transmit a signal or data or (2) transmits data to indicate the vessel is full and/or in use (which can also include data or a signal that can identify a location of the vessel and/or sensor data of at least one sensor connected to the vessel). When the moveable indicator element 10*e* is moved to show the empty indicator ID2 (e.g. moved to its empty indication position or empty indicator position), the position of the positional indicator element PIE can be moved so it is in contact with the transmitter device BT, is electrically connectable to the transmitter device BT, is magnetically connectable or engageable with the transmitter device BT, and/or is within a detection range of a positional indicator element PIE or positional sensor of the transmitter device BT to trigger the transmitter device BT to emit a signal or data so that information included in the data or signal output by the transmitter device BT is adjusted to indicate the vessel is empty and/or needs replaced.

The positional indicator element PIE can include a battery, a solar cell, or other type of power source that can be electrically connectable to the transmitter device BT via an electrically conductive connector. The connector or power source can be in electrically connective contact with the transmitter device BT when the empty indicator ID2 is in the pre-selected position to indicate the vessel is empty or needs replaced so that electrical current having a pre-selected or pre-defined current and voltage is transmittable to the transmitter device BT to power the device for activating its transmission of data and/or the signal.

The positional indicator PIE can alternatively not include a power source (e.g. be a magnet or be optically reflective or absorbent). The positional indicator element PIE can also be configured to be adjustably connected to a power source such that power is only provided to the positional indicator element PIE when a switch is adjusted to an on position for powering the positional indicator element PIE. Such a switch can be connected to the moveable indicator element so that motion of the moveable indicator element 10*e* to the empty indication position to indicate the vessel is empty toggles the power switch for the positional indicator element PIE from an off position to an on position and movement of the moveable indicator element 10*e* from the empty indication position to another position toggles the power switch for the positional indicator element PIE from the on position to the off position.

In embodiments that utilize such a power switch for the positional indicator element PIE, the transmitter device BT can be connected to a power source so it always receives power or can be connected to a power source so it only receives power at (1) regular periodic cycles or (2) when the moveable indicator element 10e is moved to the empty indication position to indicate the vessel is empty. In embodiments where the transmitter device BT is only to receive power when the moveable indicator element 10e is moved to a position to indicate the vessel is empty, the power switch can be connected to the moveable indicator element 10e so that the power switch for the transmitter device BT is toggled from an off position to an on position and movement of the moveable indicator element 10e out of the empty position to another position toggles the power switch for the transmitter device BT from the on position to the off position.

As discussed above, the transmitter device BT and/or positional indicator element PIE can be arranged and configured so that data or a signal to be output by the transmitter device BT is adjusted when the moveable indicator 10e is displaying the empty indicator (e.g. is moved to a position to indicate the vessel is empty). Movement of the moveable indicator element 10e can be configured so that the movement brings the transmitter device BT within the position detection range of the positional indicator element PIE, or the positional indicator element PIE is moved to be within the detectable range of a position sensor of the transmitter device BT as discussed herein, for example. The change in data or signal can be to adjust a portion of the data to be transmitted by the transmitter device BT so that the data or signal indicates the vessel is empty when the transmitter device BT and the positional indicator element PIE are positioned to be within a detectable range from each other. When the transmitter device BT and positional indicator element PIE are not sufficiently close to each other to be within their detection range, vessel status information provided by the transmitted data or signal can indicate the vessel is full or include a sensor data (e.g. vessel pressure, density, fill level etc.) to indicate the vessel is not empty and/or is in use.

The transmitter device BT can include circuitry that is affected by the positional indicator element PIE to effect the change in data or signal to be output by the transmitter device BT. For example, the transmitter device BT can be affected by a magnetic field emitted by the positional indicator element PIE to actuate one or more switches or other circuit elements to adjust the signal or data to be emitted by the transmitter device. As another example, the transmitter device BT can be connected to an accelerometer or optical sensor to actuate a switch or other circuitry for adjusting the data or signal output by the transmitter device BT. For instance, when the moveable indicator element 10e is in its empty indication position, the transmitter device BT can be aligned with an optical sensor of the positional indicator element PIE so that a light emitted by the optical sensor actuates a circuit element of the transmitter device to adjust the data or signal output by the transmitter device as discussed herein. When the moveable indicator element 10e is not in the empty indication position, it can be unaligned with the optical sensor of the positional indicator element PIE so that a light emitted by the optical sensor fails to interact with the circuit element so data or signal output by the transmitter device provides a full or in use data indication as discussed herein (e.g. in use, full, and/or sensor data indicating how full the vessel may be via a pressure sensor, density sensor or fill level sensor, etc.).

As yet another example, in embodiments where a positional sensor of the transmitter device BT includes an optical sensor, the positional indicator element PIE can include a light reflective material or light absorbing material to trigger detection via the positional sensor of the transmitter device BT to adjust how the transmitter device transmits data. When the moveable indicator element 10e is not in the empty indication position, the positional sensor of the transmitter device BT can be unaligned with the positional indicator element PIE so that a light emitted by the optical sensor fails to interact with the positional indicator element PIE so data or signal output by the transmitter device provides a full or in use data indication as discussed herein (e.g. in use, full, and/or sensor data indicating how full the vessel may be via a pressure sensor, density sensor or fill level sensor, etc.). In contrast, when the moveable indicator element 10e is in the empty indication position, the positional sensor of the transmitter device BT can be aligned with the positional indicator element PIE so that a light emitted by the optical sensor interact with the positional indicator element PIE so the reflected light or absorbed light triggers a detection of the positional indicator element PIE to adjust the data or signal output by the transmitter device so that data provides an empty indication or empty notification as discussed herein.

As another example, the transmitter device BT can be communicatively connectable to an accelerometer of a positional indicator element PIE that can provide positional information that can adjust the data or signal output from the transmitter device BT. In such embodiments, the accelerometer may be a positional indicator element PIE that is integrated into the transmitter device BT. An example of such an integrated positional indicator element PIE into the transmitter device BT is shown in broken line in FIGS. 5 and 7. When the moveable indicator element 10e is moved into its empty indication position, the transmitter device BT can receive positional information from the accelerometer of the positional indicator element PIE so that the data or signal output by the transmitter device indicates the vessel is empty or needs replaced as discussed herein. When the moveable indicator element 10e is not in the empty indication position, the transmitter device BT can receive data from the accelerometer of the positional indicator element PIE so that data or signal output by the transmitter device provides a full or in use data indication as discussed herein (e.g. in use, full, and/or sensor data indicating how full the vessel may be via a pressure sensor, density sensor or fill level sensor, etc.).

In addition (or as an alternative), the transmitter device BT can include a processor that runs code stored in memory connected to the processor. The processor running the code can receive data from the positional indicator element PIE when the transmitter device BT is within the positional indicator element's detection range or the positional indicator element PIE is within a detection range of a sensor of the transmitter device BT that can trigger adjustment of the data or signal that is to be output from the transmitter device as discussed herein. For example, if information is not received from the positional indicator element PIE because the transmitter device BT and positional indicator element PIE are out of their detection range, the transmitter device BT can communicate a full status and/or vessel sensor data. When the transmitter device BT and positional indicator element PIE are within their detection range, the transmitter device BT can detect this occurrence via its interaction with the positional indicator element PIE and adjust the data that it transmits so that it indicates the vessel is empty. This can include, for example, no longer providing vessel sensor data and/or providing a pre-defined empty notification within the transmitted data.

The transmitter device BT can be or include a wireless transmitter device such as, for example, a near field communication transmitter, a Bluetooth transmitter, a Bluetooth transceiver, a wireless local area network transmitter, a Long-Range (LoRa) digital wireless data transmitter, a LoRa transceiver, a cellular transmitter device or other type of wireless transmission device. In other embodiments, the transmitter device BT can be another type of wireless transmission device or be a wireless transceiver device that can include a transmitter and a receiver. As yet another example, the transmitter device BT can include a module such as a Bluetooth module, a LoRa module, or other type of wireless communication module. Such a module can include a transmitter and a receiver in some embodiments. In other embodiments, the module may only include a transmitter. In yet other configurations, the transmitter device BT can be included in a single integrated circuit or system on chip (SoC) or be included within multiple integrated circuits included in the tracking device 10. In embodiments that utilize a system on chip (SoC) approach, a processor, transmitter, receiver, as well as other hardware elements (e.g. a positional sensor, a positional indicator element PIE) can be included in the circuit of the SoC or the integrated circuits of the SoC.

As may best be appreciated from FIGS. 8-11, embodiments of the tracking device 10 can be utilized to provide significant operational and inventory management improvements for monitoring vessel usage status and managing inventory of vessels. Embodiments can also permit replacement vessels to be more easily and efficiently ordered while also improving the reuse, or refilling, process for empty vessels 1.

For instance, a vessel 1 having a tracking device 10 attached thereto as discussed above, for example, can be in a user location 8 within a facility (e.g. industrial plant, research and development lab, medical facility, etc.). The moveable indicator element 10e can be adjusted from a first position to indicate the vessel is full to a second position to indicate the vessel is in-use when being used in the use location 8. When the vessel 1 becomes empty or is at or below a pre-selected capacity level (e.g. is within an emptiness threshold) or is no longer within a usable capacity range (e.g. is no longer within a pre-selected fluid capacity level threshold, pre-selected gas capacity level threshold, etc.), the moveable indicator element 10e can be adjusted to its empty indication position to allow the empty indicator ID2 to be viewed and/or to power the transmitter device BT to emit a communication (e.g. data or a signal) to provide notification that the vessel is empty and needs to be replaced with a new, full vessel. The communication provided by the transmitter device BT can be received by at least one computer device 11 in or near the use location 8 that is within the wireless transmission range of the transmitter device BT. The computer device 11 that can receive the transmission can be a wireless gateway device, a wireless access point, a router, a wireless communication device (e.g. laptop computer device, a smart phone, a tablet, other type of user device, etc.) or a base station.

Examples of the computer devices 11 that can receive the data or signal from the transmitter device BT can include a user device (UD) 20 or a network access device (NAD) 30, for example. The user device 20 can be a smart phone, laptop computer, desktop computer, tablet, or other electronic communication device. The network access device 30 can include an access point, a gateway device, a base station, a router, or other type of network access device that can receive data from the transmitter device BT and forward that data to other devices in the local area network (LAN) of the network access device 30 or to another remote management system (RMS) 40 via at least one other network 50 to which the LAN is connected (e.g. via the internet). The remote management system 40 can include a remote server device or other type of computer device 11 that can host a service. For instance, the remote management system 40 can be a server that hosts a service via the internet or provides a cloud based service, for example.

The data or signal output by the transmitter device BT of the tracking device 10 can prompt the sending of a notification to a user or can include the sending of a notification to a user device to provide a notification on the vessel's empty status. A user who may receive that notification or who may notice the empty indicator ID2 being visually shown via the slot 10sl can react to that information by moving the empty vessel 1 having the tracking device 10 to a return location 4 in another pre-selected, specific location within the facility that is spaced apart from the use location 8. The return location 4 can be a designated area near a loading bay or other suitable location that can facilitate the pickup of empty vessels 1 for returning them to a fluid provider so that they can be refilled with a compressed fluid (e.g. a compressed gas, a compressed mixture of gases, etc.), for example. In some embodiments, the return location 4 can include one or more containers designed to hold multiple empty vessels and an empty vessel 1 can be placed in such a container in the return location 4.

In the return location, 4, the tracking device 10 can still have its moveable indicator element 10e in the empty indication position so the transmitter device BT is still able to transmit data and/or a signal. The data or signal can be received by a network access device 30 or user device 20 in or near the return location 4 that is within the wireless transmission range of the transmitter device BT. The user device 20 or network access device 30 can forward that data to a remote management system 40 via at least one network 50 (e.g. via the LAN and/or the internet, etc.). The remote management system 40 can be a server or other type of service hosting device configured to manage inventory and/or distribution of fluid vessels 1, for example.

The remote management system 40 can utilize the data or signal received from the tracking device's transmitter device BT, which can include at least an identifier for the fluid vessel 1. The identifier can include, for example, a serial number for the transmitter device BT, a serial number assigned to the vessel 1, or another type of identification number, identification code, or other type of identifier. The remote management system 40 can be configured to utilize the identifier and/or determine the identifier from the data or signal received from the transmitter device BT and cross-reference that identifier with information about the vessel 1 stored in a data store DS in the memory of the remote management system 40 and/or a vessel inventory management system (VIMS) 70 that can be communicatively connectable to the remote management system (RMS) 40 via a network connection or other type of communication connection.

The cross-referenced data determinable from the identifier received by the remote management system 40 can include at least one of: (i) a calibration certificate for the fluid or fluid mixture within the vessel, (ii) a material safety data sheet for the fluid or fluid mixture within the vessel, (iii) an expiration date assigned to the vessel (e.g. a vessel retest date), (iv) a customer contact assigned to the vessel, (v) a fluid type contained in the vessel (e.g. oxygen gas, nitrogen gas, hydrogen gas, etc.), (vi) an expiration date for the fluid or fluid mixture within the vessel, (vii) vessel reorder code, and (viii) vessel technical data. It should be appreciated that a fluid or fluid mixture includes a gas or mixture of gases as well as other types of fluid and fluid mixtures. The remote management system 40 can utilize the obtained data to send a notification to a customer or user of the vessel to indicate one or more of: (a) the vessel needs to be replaced, (b) notification that a new replacement vessel has been ordered, (c) delivery estimation information for delivery of a new replacement vessel, (d) estimated time for pickup of the empty vessel 1, (e) the vessel retest date is due or coming due (e.g. the time is within a pre-selected retest date warning time period), and (f) the content of the vessel 1 will soon expire (e.g. the vessel retest date is approaching or the vessel retest date is within a pre-selected retest warning time period from the retest date), i.e.—the vessel content shelf life will soon expire. The remote management system 40 can send a single message or notification to a single addressee or user device or can send multiple notifications to multiple different devices.

For example, the remote management system 40 can retrieve data related to a vessel based on the cross-reference of data that is determinable from the identifier. The retrieved data can include at least one of: a Safety Data Sheet (SDS) of the vessel or for the fluid retained in the vessel, vessel retest date information, a fluid expiration date for fluid retained in the vessel, contents of the fluid within the vessel, a certificate of analysis (CofA), and/or a certificate of conformity (CoC). The remote management system 40 can communicate the retrieved data to a user device for output of the retrieved data to the user. The output can be provided in one or more notifications and/or via at least one display provided by a graphical user interface that can be generated by a user device based on data the user device receives from the remote management system 40.

In some situations, the remote management system 40 can send different types of notifications to different users or user devices. For example, a first notification can be sent via email or text message to one or more pre-designated user addresses (e.g. user device phone numbers, user email addresses, etc.) to identify that the vessel needs to be replaced, a new replacement vessel is ordered, and/or provide a delivery estimation for the new replacement vessel. At least one second notification can be sent to at least one address or user device associated with purchasing for automatic invoice processing. For instance, at least one second notification can be sent to order processing system (OPS) 60 (e.g. email address, phone number, or other communication address for providing an invoicing notification for the ordered new vessel, etc.).

Embodiments can also be configured to track a filled capacity status of different vessels 1 and/or the locations of the vessels 1. For example, the tracking device 10 can be communicatively connected to a pressure sensor VS or other type of content sensor VS of the vessel 1 (e.g. a fill sensor or density sensor, etc.) and provide pressure data or other sensor data with the transmitted signal or data transmitted to a user device 20 and/or network access device 30 for communicating that data to the remote management system 40 and/or at least one user device 20. The remote management system 40 and/or user device 20 can utilize the pressure data or other sensor data to determine a capacity of the vessel. If the filled capacity level is determined to be at or below a pre-selected emptiness threshold (e.g. within 20% of being empty, within 10% of being empty, etc.), the sending of at least one first notification and/or at least one second notification can be prompted by the remote management system 40. Alternatively (or in addition), the user device 20 can prompt a user to initiate a new order of a replacement vessel or to prompt replacement of the vessel by the user so the current vessel is switched to its third, empty indicator position and moved to the return location 4 and a new full vessel is used to replace that vessel in the use location 8.

The data received from the pressure sensor VS or other vessel sensor VS that can be communicated via the transmitter device BT of the tracking device 10 can be utilized to determine a leak status of the vessel 1 or valve 1v of the vessel. For example, in response to receiving data showing an unexpected or unusual drop in pressure within the vessel 1 over a pre-selected time period has occurred based on data output from the transmitter device BT, the remote management system 40 or user device 20 can determine that the vessel 1 or valve 1v has a leak that needs to be addressed. A notification can be communicated to one or more user addresses (e.g. email, text messaging address, instant message address, etc.) to have the vessel or valve evaluated for a leak condition in response to such a determination.

The tracking device 10 can also be configured to make such a determination based on the sensor data. In response to such a determination, the tracking device can be configured to emit at least one leak indication. Such an indication can be a notification communicated via the transceiver (Trcv), the transmitter device BT, or output from an output device or display of the tracking device 10. This indication can be communicated in addition to or in replacement of a notification that may be provided by a user device 20 and/or remote management system 40.

The user device 20 and/or remote management system 40 can also utilize the fill state data received from the transmitter device BT to track empirical use of vessels for a customer to better estimate re-ordering of replacement vessels and delivery of such vessels to better meet customer demand for vessels containing different fluid. Such information can help the supplier better manage production to meet customer needs while also providing improved delivery of replacement vessels and inventory management of customer vessels that better accounts for customer use of the different fluids within the vessels being delivered or purchased.

For example, empirical data concerning use of vessels and their rate of replacement can be utilized to optimize delivery of full replacement vessels and collection of empty vessels. For instance, if there are three empty vessels on site in the return location 4 but another ten vessels have been in use for some time, the remote management system 40 can determine that the usage rate of the in-use vessels indicates that delivery of replacement vessels and collection of empty vessels can be delayed to account for the usage rate of the other in-use vessels. Empirical data can also be utilized to determine usage rate at a particular facility to facilitate demand forecasting for scheduling delivery of replacement vessels and collection of empty vessels to avoid a user from running out of vessels and allow for optimization of the empty vessel collection and filling process. As another example, if there are three empty vessels on site in the return location 4 and another three vessels are currently in use with no additional vessels in inventory, the remote management system 40 can determine that the usage rate of the in-use vessels indicates that delivery of replacement vessels and collection of empty vessels should occur promptly to account for the usage rate of the in-use vessels and the lack of available inventory.

Also, empirical data can be utilized to determine usage rate at a particular facility to facilitate demand forecasting for scheduling delivery of new replacement vessels and collection of empty vessels to avoid a user from running out of vessels and allow for optimization of the empty vessel collection and filling process. For instance, the decision making process for scheduling delivery and/or collection can utilize empirical usage rate and demand data for a particular facility in the scheduling of delivery of new replacement vessels and/or collection of empty vessels.

Utilization of the empirical location and use data from tracking of the vessels can also facilitate the providing of data by the remote management system 40 to facilitate improved inventory management by providing data for generation of user interface displays to indicate site usage rates and inventory levels that are currently present as well as providing historical trend data based on the empirical tracked data obtained by the remote management system 40. Such displays can help a user better plan inventory management, oversee ongoing vessel usage, and manage the reordering of vessels to better meet a particular location's needs.

The location of the tracking device 10 can also be tracked by use of the data or signal from the transmitter device BT. For example, a network access device 30 can use signal strength from the data or signal provided by the transmitter device BT of the tracking device 10 to associate a location with the device (e.g. via triangulation or other method). As another example, location of the vessel can be inferred from the location of the network access device 30 or the user device 20 via use of their signal strengths of the signal received from the transmitter device BT. As yet another example, the transmitter device BT can include a global positioning system (GPS) and can include the GPS location data in the data or signal being transmitted to indicate the location of the vessel 1. The location information can be utilized by a user device 20 and/or remote management system 40 to track the location of the vessel.

The location of the vessel can be utilized to help locate a lost vessel. For example, a user can utilize a user device to query the remote management system 40 to determine the location of a vessel. The remote management system 40 can respond to such a query by providing the most recent location information it has for the vessel identified in the query, which can then be used to find a missing or lost vessel.

As another example, the location information can be utilized to determine if a vessel has been placed in a return location 4. For example, in response to a notification of an empty vessel, the remote management system 40 can be queried to determine the location of the vessel to determine whether that vessel needs to be moved to the return location 4 or is already positioned in that location. The location information that may be obtained from such a query can help a user track the location and move the vessel to an appropriate location.

In some embodiments, the transmitter device BT can be configured to only be activated after the vessel indicator is moved to indicate the vessel is empty or sufficiently near empty for needing to be replaced (e.g. the empty indicator ID2 is moved to be displayed to indicate the vessel 1 is empty or needs replaced). In other embodiments, a power source may always be connected to the transmitter device BT or may be regularly connected to the transmitter device BT at regular time period intervals to trigger the sending of one or more of: (1) location data, (2) fill status data, (3) identifier information, (4) sensor data from sensors connected to the tracking device (e.g. nearby environmental conditions by the vessel such as temperature, humidity, pressure, presence of one or more detected materials, etc.). Additionally, when the vessel 1 is determined to be at or within an emptiness threshold, the transmitter device can be activated to transmit data or a signal to indicate the vessel is empty and needs replaced.

Additionally, some embodiments of the tracking device 10 can include a motor or actuator that can be actuated to move the moveable indicator element 10e to adjust the indicia being displayed between the different status identifier positions. Alternatively, no motor or actuator can be utilized and a user can be prompted from a user device 20 to adjust the indicia by manually moving the moveable indicator element 10e or can move the moveable indicator element 10e on his or her own from determining that the vessel 1 is empty. In yet other embodiments, the moveable indicia indicator 10e can be replaced with or supplemented with by a display that can be controlled to adjust a displayed indicator between the different display indicia (e.g. full, in-use, empty, etc.). Such a display (Disp) can be connected to the power source PWR and processor (Proc.) and can be utilized in conjunction with motorized or actuator driven automatically controlled motion of the moveable indicator element 10e and/or manual motion of the moveable indicator element 10e. Alternatively, such a display (Disp) can be connected to the power source PWR and processor (Proc.) and can be utilized as a substitute for a motorized or actuator driven automatically controlled motion of the moveable indicator element 10e and/or manual motion of the moveable indicator element 10e.

It should be appreciated that the tracking device 10 embodiments discussed herein can include electrical hardware components. The components can include a processor (Proc.) connected to a non-transitory memory (Mem.) that can have at least one application (App) and/or at least one data store (DS) stored thereon. The data store DS can include the identifier of the transmitter device BT, tracking device 10, or vessel 1 to which the tracking device is connected. The application (App) can include code that defines one or more methods performed by the tracking device 10 when the processor runs the code. The processor can also be connected to the transmitter device BT, at least one transceiver (Trcv) (e.g. a cellular network transceiver, LAN transceiver, GPS receiver), the power source (PWR) at least one input device and/or at least one output device. The power source (PWR) can include a battery, rechargeable battery, a solar cell powered battery, an arrangement of batteries or rechargeable batteries, or other type of power source for powering the device. An output device or input device can include an input/output device (e.g. a touch screen display). In some embodiments, a user device such as a smart phone, tablet, or laptop computer can be communicatively connectable to the tracking device 10 via the transmitter device BT or other transceiver to provide input to the tracking device 10 and/or receive data from the tracking device 10.

The other computer devices 11 discussed herein, such as the user device (UD) 20, network access device (NAD) 30, remote management system (RMS) 40, order processing system (OPS) 60, and vessel inventory management system (VIMS) 70, can also include electrical hardware components. These components can include a processor (Proc.) connected to a non-transitory memory (Mem.) that can have at least one application (App) and/or at least one data store (DS) stored thereon. The data store can include at least one database or other types of files that may be utilized when at least one application (App) is run by the processor. The application (App) can include code that defines one or more methods performed by the computer device 11 when the processor runs the code. The processor can also be connected to a transmitter device BT (e.g. a Bluetooth transceiver, a near field communication transceiver, etc.) and/or at least one transceiver (Trcv) (e.g. a cellular network transceiver, LAN transceiver, GPS receiver), a power source (PWR), at least one input device (e.g. button, keyboard, pointer device, mouse, etc.) and/or at least one output device (display, printer, etc.). An output device or input device can include an input/output device (e.g. a touch screen display).

In some embodiments, the network access devices 30 can include wireless gateways. The gateways can be connectable to different structures within a facility as well as one or more mobile vehicles (e.g. forklifts, truck, drone, etc.) Such devices 30 can be moved about the facility to collect information from the tracking devices 10 throughout a facility to provide data to the remote management system 40 and/or at least one user device 20 as discussed herein. IN such embodiments, the network access devices can include a GPS sensor or other type of positional device to provide position data to the remote management system 40 together with data received from the tracking device 10.

User devices 20 can be configured to provide this same type of functionality instead of the network access devices 30 and/or in combination with those devices. Users walking around with user devices 20 (e.g. smart phones, tablets, etc.) can collect tracking device data via their transmitter devices BT and utilize that data and/or transmit that collected data to the remote management system 40 for use as discussed herein.

Figure 11:
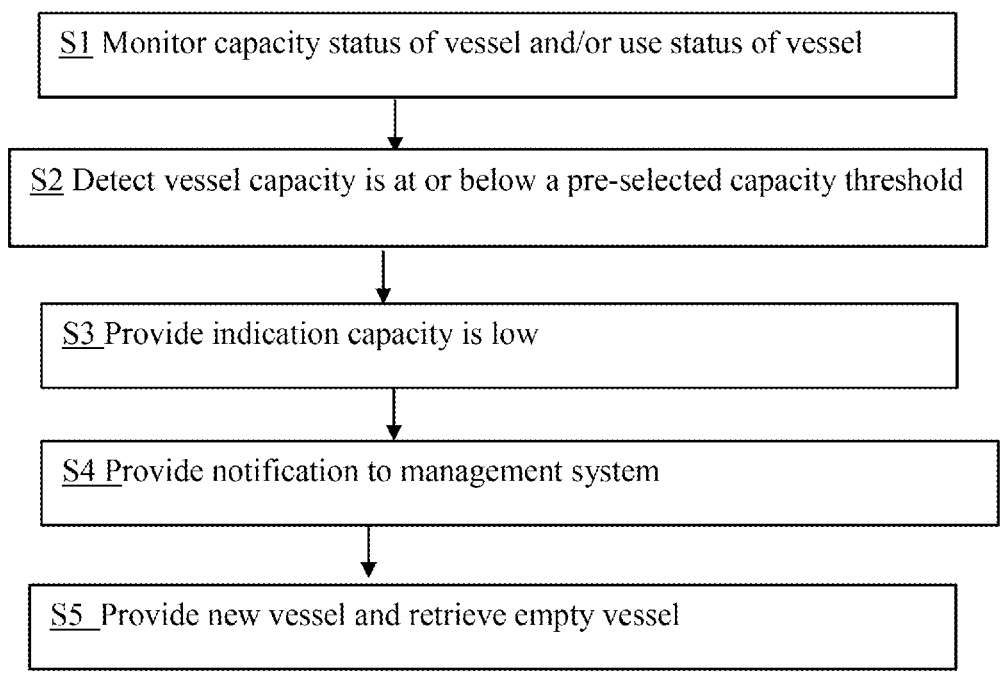
FIG. 11 is a flow chart illustrating an exemplary method that can be implemented by the exemplary embodiment of the monitoring apparatus.
Figure 12:
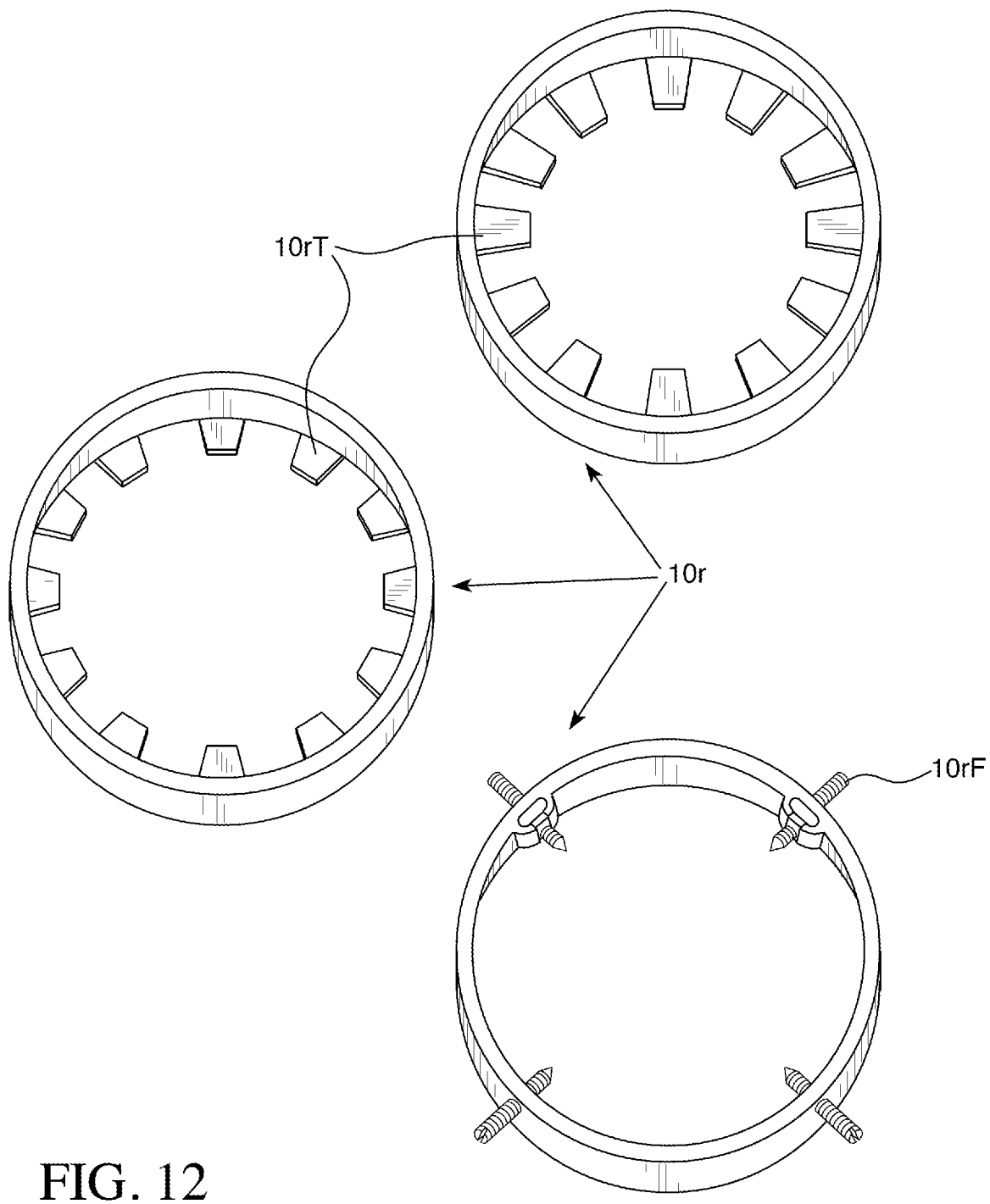
FIG. 12 is a perspective view of multiple different exemplary attachment rings 10r that can be utilized in embodiments of the tracking device 10.

As may be appreciated from FIG. 11, embodiments of the apparatuses for monitoring and/or tracking such vessels can be utilized in methods for providing vessels, methods for distribution of vessels, methods of vessel inventory management, and methods of tracking vessels. For instance, embodiments can be utilized in a first step S1 to monitor the capacity status of a vessel and/or use status of the vessel. This monitoring can include the tracking device 10 regularly transmitting data via the transmitter device BT to indicate one or more of: (i) the location of the vessel, (ii) sensor data of at least one sensor connected to the vessel (e.g. density sensor data, pressure sensor data and/or liquid level sensor data). The transmission of such data can be output continuously or at regular pre-defined intervals in accordance with a pre-defined transmission cycle.

The tracking device 10 and/or a user can adjust an indicia of the tracking device to help with this monitoring as discussed herein, for example. In a second step S2, the vessel capacity can be detected as being at or below a pre-selected capacity threshold (e.g. be at a pre-selected pressure value, be determined to be empty, be determined to be within some pre-selected threshold value of empty, etc.). The detection can occur by a user or via the tracking device 10 as discussed herein, for example.

In a third step S3, an indication can be provided to indicate the vessel is empty or near empty (e.g. the vessel capacity is low or determined to be low). The provided indication can be by a user moving a moveable indicator element 10e, or by the tracking device 10 adjusting the indicator as discussed herein, for example. The adjustment of the position of the transmitter device BT that can occur via movement of the moveable indicator element 10e and/or the communication of position data from the positional indicator element PIE to the transmitter device via such movement can be utilized to adjust the data output from the transmitter device BT so that the data output from the tracking device's transmitter device indicates the vessel is empty and needs replaced. This empty indication can be provided in addition to other tracking device information (e.g. vessel location, vessel or transmitter identifier information, sensor data, etc.).

In a fourth step S4, a notification can be provided to the remote management system 40, a user device 20, and/or another type of management device. Examples of such provided notifications can include sending of at least one first notification, at least one second notification, and/or other type of notification as discussed herein, for example. The notification can include a notification sent by the tracking device 10, transmitter device BT of the tracking device 10, and/or a notification provided by a user device 20 or remote management system 40 as discussed herein, for example.

In a fifth step S5, a replacement vessel can be provided to replace the low or empty vessel and the low or empty vessel being replaced can also be retrieved for reuse. Example of such providing of the replacement vessels and retrieval of the used empty vessels are discussed herein. Such actions can occur at the same time or can occur at different times (e.g. delivery of the replacement vessel may occur after or before the old vessel is retrieved from the return location 4 or the delivery of the replacement vessel can occur at the same time the empty vessel is retrieved for reuse or recycling from the return location 4).

It should be appreciated that various adjustments can be made to embodiments discussed herein to meet a particular set of design criteria. For instance, embodiments of the compressed fluid vessels, apparatuses for monitoring and/or tracking such vessels, methods of monitoring such vessels, methods of providing such vessels, methods for distribution of such vessels as well as methods of making and using such vessels and apparatuses can be adapted to meet a particular set of design criteria. For example, embodiments of the vessel can retain different types of gases, gas mixtures, gas/liquid mixtures, or other types of fluid. As another example, the tracking device 10 can include various other hardware elements or be configured to perform other methods as defined by code that can be stored in memory that is accessible and runnable by at least one processor of the tracking device 10. As yet another example, the size and shape of the vessel 1 or collar body 10cb, and/or the hardware used for the tracking device 10 can be any of a number of suitable options for meeting a particular set of design criteria.

As yet another example, the specific configuration of different user devices 20, network access devices 30, remote management system(s) 40, order processing system 60, vessel inventory management system 70, and/or use of other computer devices 11 or systems having one or more of such devices can be arranged to meet a particular type of communication system environment, customer network infrastructure, or other type communication system design criteria. The operating system, inventory management software, and other types of configurations utilized by such devices can be adapted for a particular situation when making or using a particular embodiment. As another example, the LAN can be a mesh wireless network, a local area wireless network, a combination of networks that may be an enterprise network or a component of a larger enterprise network, or another type of LAN. Also, the data and communications exchanged between the tracking device and/or other computer devices 11 can utilize different types of communication protocols and/or encryption schemes and be adapted to comply with different types of network security methodologies and/or communication security methodologies.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of compressed fluid vessels, apparatuses for monitoring and/or tracking such vessels, methods of monitoring such vessels, methods of providing such vessels, methods for distribution of such vessels as well as methods of making and using such vessels and apparatuses have been shown and described above, it is to be distinctly understood that the invention is not limited thereto but may be otherwise variously embodied and practiced within the scope of the following claims.

What is claimed is:

1. An apparatus for monitoring a vessel retaining a compressed fluid, the apparatus comprising:
    a tracking device comprising a collar body that is attachable to a body of the vessel retaining the compressed fluid wherein the collar body comprises a plurality of sidewalls that are removably coupled together by a releasable attachment mechanism; and
    the tracking device having a wireless transmitter device configured to wirelessly transmit data or a signal to indicate the vessel is empty in response to the vessel being determined to be empty or within a pre-selected emptiness threshold;
    the plurality of sidewalls defining an upper opening, a bottom opening, and a cavity, the cavity being in communication with the upper opening and the bottom opening to retain a portion of the body of the vessel therein;
    an indicator element positionable within a slot of the collar body or on the collar body, the indicator element having at least one indicia for indicating a status of the vessel, the indicator element being moveably attached to at least one of the sidewalls so that the indicator element is moveable to adjust which of the at least one indicia is viewable from the slot;
    the at least one indicia being positioned on an exterior side of the indicator element opposite an interior side of the indicator element, the at least one indicia including an empty indicator:
    the wireless transmitter device positioned so that the wireless transmitter device transmits the data or the signal to indicate the vessel is empty via engagement with a positional indicator positioned adjacent to the slot and/or the indicator element that is creatable while the empty indicator is viewable from the slot.

2. The apparatus of claim 1, wherein the wireless transmitter device is attached to the interior side of the indicator element to face toward the cavity such that a position of the wireless transmitter device is adjusted when the indicator element is moved and the positional indicator element being positioned so that the positional indicator element engages with the wireless transmitter device while the empty indicator is viewable from the slot to trigger the wireless transmitter device to transmit the data or the signal to indicate the vessel is empty.

3. The apparatus of claim 1, wherein the at least one indicia also includes a full indicator, an in-use indicator, and/or an in-use and empty indicator.

4. The apparatus of claim 1, wherein the at least one indicia includes multiple indicia and the indicator element is a moveable indicator element that is moveably positionable between different positions to adjust which of the indicia is viewable via the slot.

5. The apparatus of claim 1, wherein the tracking device includes at least one attachment ring attachable to the collar body for attaching the collar body to the body of the vessel.

6. The apparatus of claim 1, comprising:
    a remote management system or a user device configured to receive the data or signal from the transmitter device of the tracking device, evaluate the data or signal, determine whether the vessel needs to be replaced, and, in response to determining the vessel needs to be replaced, sending at least one notification for replacement of the vessel.

7. The apparatus of claim 1, wherein the positional indicator element is attached to the interior side of the indicator element to face toward the cavity such that a position of the positional indicator element is adjusted when the indicator element is moved, the positional indicator element being positioned so that the positional indicator element engages with the wireless transmitter device while the empty indicator is viewable from the slot to trigger the wireless transmitter device to transmit the data or the signal to indicate the vessel is empty.

8. The apparatus of claim 7, wherein the wireless transmitter device is attached to at least one of the sidewalls adjacent to the slot.

9. The apparatus of claim 1, wherein the data or signal from the transmitter device of the tracking device includes sensor data from a sensor communicatively connectable to the tracking device.

10. The apparatus of claim 9, wherein the sensor is a pressure sensor connected to the vessel, a density sensor connected to the vessel, or a liquid level sensor connected to the vessel.

11. The apparatus of claim 1, wherein the wireless transmitter device is positioned and configured to transmit the data or signal to provide at least one of a vessel identifier, transmitter identifier information, vessel capacity status information, fluid type information identifying a fluid stored in the vessel, vessel pressure sensor information, vessel density sensor information, vessel liquid level sensor information, and vessel location information.

12. The apparatus of claim 11, comprising:
    a user device positioned and configured to receive the data or signal from the transmitter device of the tracking device, evaluate the data or signal, determine whether the vessel needs to be replaced, and, in response to determining the vessel needs to be replaced, sending at least one notification for replacement of the vessel.

13. The apparatus of claim 11, comprising:
    a user device or a remote management system positioned and configured to receive the data or signal from the transmitter device of the tracking device, evaluate the data or signal to determine a leak status of the vessel, and, in response to determining there is a leak, communicate at least one notification to identify a leak condition of the vessel.

14. The apparatus of claim 11, comprising:
    a remote management system positioned and configured to receive the data or signal from the transmitter device of the tracking device, evaluate the data or signal, determine whether the vessel needs replaced, and, in response to determining the vessel needs replaced, sending at least one notification for replacement of the vessel.

15. The apparatus of claim 14, wherein the notification includes at least one first notification indicating a replacement vessel is ordered to replace the vessel to which the tracking device is attached or releasably attached.

16. The apparatus of claim 14, comprising:
at least one user device and/or at least one network access device positioned and configured to receive the data or signal from the transmitter device of the tracking device and forward the data or the signal to the remote management system.

17. The apparatus of claim 1, wherein the tracking device comprises the positional indicator element, the positional indicator element being positioned to detect at least one position of the wireless transmitter device for determining the vessel is empty or within the pre-selected emptiness threshold; and
the wireless transmitter device configured to wirelessly transmit the data or the signal to indicate the vessel is empty in response to the positional indicator element providing an indication that the wireless transmitter device is in a position to indicate the vessel is empty or within the pre-selected emptiness threshold via the engagement the positional indicator element has with the wireless transmitter device while the empty indicator is viewable from the slot.

18. The apparatus of claim 17, wherein the engagement that the positional indicator element has with the wireless transmitter device is an electrical connection that is formed when the indicator element is moved so that the empty indicator is viewable from the slot.

19. The apparatus of claim 17, wherein the positional indicator element includes a positional reference point and the wireless transmitter device includes a positional sensor that interacts with the location reference point to trigger detection of the location reference point when the indicator element is moved so that the empty indicator is viewable from the slot so that the wireless transmitter device transmits the data or the signal to indicate the vessel is empty.

20. The apparatus of claim 17, wherein the positional indictor element includes a magnet, an electrical contact, an optically reflective surface or an optically absorbing surface that is positioned to actuate a change to the wireless transmitter device so that the wireless transmitter device transmits the data or the signal to indicate the vessel is empty.

21. The apparatus of claim 17, wherein the wireless transmitter device is attached to the interior side of the indicator element to face toward the cavity such that a position of the wireless transmitter device is adjusted when the indicator element is moved.

\* \* \* \* \*